US 9,798,800 B2

(12) United States Patent
Duboue et al.

(10) Patent No.: US 9,798,800 B2
(45) Date of Patent: Oct. 24, 2017

(54) PROVIDING QUESTION AND ANSWERS WITH DEFERRED TYPE EVALUATION USING TEXT WITH LIMITED STRUCTURE

(75) Inventors: Pablo A. Duboue, Montreal (CA); James J. Fan, Parsippany, NJ (US); David A. Ferrucci, Yorktown Heights, NY (US); James W. Murdock, IV, Millwood, NY (US); Christopher A. Welty, Hawthorne, NY (US); Wlodek W. Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 13/239,165

(22) Filed: Sep. 21, 2011

(65) Prior Publication Data

US 2012/0078902 A1 Mar. 29, 2012

Related U.S. Application Data

(60) Provisional application No. 61/386,017, filed on Sep. 24, 2010.

(51) Int. Cl.
*G06F 7/00* (2006.01)
*G06F 17/30* (2006.01)

(52) U.S. Cl.
CPC .............................. *G06F 17/30675* (2013.01)

(58) Field of Classification Search
CPC ............. G06F 17/3075; G06F 17/3064; G06F 17/30684; G06F 17/30722; G06F 17/30654; G06F 17/30011

(Continued)

(56) References Cited

U.S. PATENT DOCUMENTS 3,559,995 A 2/1971 Steadman
4,594,686 A 6/1986 Yoshida
(Continued)

FOREIGN PATENT DOCUMENTS

CN 1629833 A 6/2005
CN 101079070 A 11/2007
CN 101454749 A 6/2009

OTHER PUBLICATIONS

"Unstructured Data", Wikipedia, Retrieved on Jul. 5, 2013.*
(Continued)

*Primary Examiner* — James Trujillo
*Assistant Examiner* — John J Morris
(74) *Attorney, Agent, or Firm* — Scully, Scott, Murphy & Presser, P.C.

(57) ABSTRACT

A system, method and computer program product for conducting questions and answers with deferred type evaluation based on any corpus of data. The method includes processing a query including waiting until a "Type" (i.e. a descriptor) is determined AND a candidate answer is provided. Then, a search is conducted to look (search) for evidence that the candidate answer has the required Lexical Answer Type (e.g., as determined by a matching function that can leverage a parser, a semantic interpreter and/or a simple pattern matcher). Prior to or during candidate answer evaluation, a process is provided for extracting and storing collections of entity-type pairs from semi-structured text documents. During QA processing and candidate answer scoring, a process is implemented to match the query LAT against the lexical type of each provided candidate answer and generate a score judging a degree of match.

21 Claims, 10 Drawing Sheets

(58) Field of Classification Search
USPC ........ 707/708, 736, 755, 760, 771, E17.014, 707/999.003, 999.102; 704/9, 257
See application file for complete search history.

(56) References Cited

U.S. PATENT DOCUMENTS

| | | |
|---|---|---|
| 4,599,691 A | 7/1986 | Sakaki et al. |
| 4,829,423 A | 5/1989 | Tennant et al. |
| 4,921,427 A | 5/1990 | Dunn |
| 5,374,894 A | 12/1994 | Fong |
| 5,414,797 A | 5/1995 | Vassiliadis et al. |
| 5,513,116 A | 4/1996 | Buckley et al. |
| 5,546,316 A | 8/1996 | Buckley et al. |
| 5,550,746 A | 8/1996 | Jacobs |
| 5,559,714 A | 9/1996 | Banks et al. |
| 5,634,051 A | 5/1997 | Thomson |
| 5,794,050 A | 8/1998 | Dahlgren et al. |
| 6,487,545 B1 | 11/2002 | Wical |
| 6,763,341 B2 | 7/2004 | Okude |
| 6,829,603 B1 | 12/2004 | Chai et al. |
| 6,947,885 B2 | 9/2005 | Bangalore et al. |
| 6,983,252 B2 | 1/2006 | Matheson et al. |
| 7,092,928 B1 | 8/2006 | Elad et al. |
| 7,136,909 B2 | 11/2006 | Balasuriya |
| 7,139,752 B2 | 11/2006 | Broder et al. |
| 7,181,438 B1 | 2/2007 | Szabo |
| 7,216,073 B2 | 5/2007 | Lavi et al. |
| 7,376,634 B2 | 5/2008 | Liu et al. |
| 7,558,778 B2 | 7/2009 | Carus et al. |
| 7,590,606 B1 | 9/2009 | Keller et al. |
| 7,593,940 B2 | 9/2009 | Gruhl et al. |
| 7,730,085 B2 | 6/2010 | Hassan et al. |
| 7,739,273 B2 | 6/2010 | Brodie et al. |
| 7,805,303 B2 | 9/2010 | Sugihara et al. |
| 2001/0032211 A1 | 10/2001 | Kuzumaki |
| 2003/0033287 A1 | 2/2003 | Shanahan et al. |
| 2003/0033288 A1* | 2/2003 | Shanahan et al. ................. 707/3 |
| 2004/0049499 A1* | 3/2004 | Nomoto et al. .................... 707/3 |
| 2004/0064305 A1 | 4/2004 | Sakai |
| 2004/0122660 A1 | 6/2004 | Cheng et al. |
| 2004/0205448 A1* | 10/2004 | Grefenstette ..... G06F 17/30867 715/230 |
| 2004/0249796 A1* | 12/2004 | Azzam ............................... 707/3 |
| 2004/0249829 A1* | 12/2004 | Kasravi ............. G06F 17/30958 |
| 2004/0254917 A1 | 12/2004 | Brill et al. |
| 2005/0033711 A1 | 2/2005 | Horvitz et al. |
| 2005/0060301 A1 | 3/2005 | Seki et al. |
| 2005/0086045 A1 | 4/2005 | Murata |
| 2005/0086222 A1 | 4/2005 | Wang et al. |
| 2005/0114327 A1 | 5/2005 | Kumamoto et al. |
| 2005/0143999 A1 | 6/2005 | Ichimura |
| 2005/0234968 A1* | 10/2005 | Arumainayagam et al. . 707/102 |
| 2005/0256700 A1 | 11/2005 | Moldovan et al. |
| 2005/0289168 A1 | 12/2005 | Green et al. |
| 2006/0053000 A1 | 3/2006 | Moldovan et al. |
| 2006/0106788 A1 | 5/2006 | Forrest |
| 2006/0122834 A1 | 6/2006 | Bennett |
| 2006/0141438 A1 | 6/2006 | Chang et al. |
| 2006/0173834 A1 | 8/2006 | Brill et al. |
| 2006/0204945 A1 | 9/2006 | Masuichi et al. |
| 2006/0206472 A1 | 9/2006 | Masuichi et al. |
| 2006/0206481 A1 | 9/2006 | Ohkuma et al. |
| 2006/0235689 A1* | 10/2006 | Sugihara et al. .............. 704/257 |
| 2006/0277165 A1 | 12/2006 | Yoshimura et al. |
| 2006/0282414 A1 | 12/2006 | Sugihara et al. |
| 2006/0294037 A1 | 12/2006 | Horvitz et al. |
| 2007/0022099 A1 | 1/2007 | Yoshimura et al. |
| 2007/0022109 A1 | 1/2007 | Imielinski et al. |
| 2007/0073533 A1* | 3/2007 | Thione et al. .................... 704/9 |
| 2007/0073683 A1 | 3/2007 | Kobayashi et al. |
| 2007/0078842 A1 | 4/2007 | Zola et al. |
| 2007/0094285 A1* | 4/2007 | Agichtein et al. ............ 707/101 |
| 2007/0118518 A1 | 5/2007 | Wu et al. |
| 2007/0136246 A1 | 6/2007 | Stenchikova et al. |
| 2007/0196804 A1 | 8/2007 | Yoshimura et al. |
| 2007/0203863 A1 | 8/2007 | Gupta et al. |
| 2008/0077570 A1 | 3/2008 | Tang et al. |
| 2009/0192966 A1 | 7/2009 | Horvitz et al. |
| 2009/0254527 A1* | 10/2009 | Jung et al. ........................ 707/3 |
| 2009/0259642 A1 | 10/2009 | Cao et al. |
| 2009/0287678 A1 | 11/2009 | Brown et al. |
| 2009/0292687 A1* | 11/2009 | Fan et al. .......................... 707/5 |
| 2010/0100546 A1 | 4/2010 | Kohler |
| 2011/0066587 A1 | 3/2011 | Ferrucci et al. |
| 2011/0078192 A1* | 3/2011 | Murdock, IV ................ 707/780 |

OTHER PUBLICATIONS

International Search Report from PCT/US 11/52597 mailed Feb. 7, 2012.

Chu-Carroll et al., "In Question-Ansering, Two Heads are Better than One", HLT-NAACL'03, May-Jun. 2003, pp. 24-31, Edmonton, Canada.

Ferrucci et al., "Towards the Open Advancement of Question Answering Systems," IBM Technical Report RC24789, Computer Science, Apr. 22, 2009.

Moldovan et al., "COGEX: A Logic Prover for Question Answering," Proceedings of HLT-NAACL 2003, May-Jun. 2003, pp. 87-93, Edmonton, Canada.

Simmons, "Natural Language Question-Answering Systems: 1969," Communications of the ACM, Jan. 1970, pp. 15-30, 13(1).

Voorhees et al., "Overview of the TREC 2005 Question Answering Track," Proceedings of the Fourteenth Text Retrieval Conference, 2005, Gaithersburg, Maryland.

Weinstein et al., "Agents Swarming in Semantic Spaces to Corroborate Hypotheses," AAMAS'04, Jul. 19-23, 2004, New York, New York, USA, Copyright 2004 ACM 1-58113-864-4/04/007.

Prager et al., "A Multi-Strategy, Multi-Question Approach to Question Answering," In New Directions in Question-Answering, Maybury, M. (Ed.), AAAI Press, 2004.

Strzalkowski et al., "Advances in Open-Domain Question-Answering," Springer, 2006 (background information only—front cover, copyright page and table of contents only).

Balahur, "Going Beyond Traditional QA Systems: Challenges and Keys in Opinions Question Answering," Coling 2010: Poster Volume, pp. 27-35, Beijing, Aug. 2010.

Blitzer, Domain Adaptation of Natural Language Processing Systems, Presented to the Faculties of the University of Pennsylvania in Partial Fulfillment of the Requirements for the Degree of Doctor of Philosophy, 2007.

University of Illinois at Urbana-Champaign, Department of Computer Science, Research, 2010, http://cs.illinois.edu/research?report=UIUCDCS-R-2008-2974.

National Center for Biotechnology Information (NCBI), Entrez the Life Sciences Search Engine, Oct. 28, 2009.

Chang et al., "Creating an Online Dictionary of Abbreviations from MEDLINE," J Am Med Inform Assoc. 2002; 9:612-620. DOI 10.1197/jamia.M1139.

Adar, "SaRAD: a Simple and Robust Abbreviation Dictionary," Bioinformatics, Mar. 2004, pp. 527-533, vol. 20 Issue 4.

"INDRI Language modeling meets inference networks," http://www.lemurproject.org/indri/, last modified May 23, 2011; pp. 1-2.

"Apache UIMA ConceptMapper Annotator Documentation," Written and maintained by the Apache UIMA Development Community, Version 2.3.1, Copyright 2006, 2011 The Apache Software Foundation, pp. 1-7, http://uima.apache.org/sandbox.html#concept.mapper.annotator.

Aditya et al., "Leveraging Community-built Knowledge for Type Coercion in Question Answering," Proceedings of ISWC 2011.

Pasca, "Question-Driven Semantic Filters for Answer Retrieval", International Journal of Pattern Recognition and Artificial Intelligence (IJPRAI), World Scientific Publishing, SI, vol. 17, No. 5, Aug. 1, 2003, pp. 741-756.

Cucerzan et al., "Factoid Question Answering over Unstructured and Structured Web Content", In Proceedings of the 14th Text Retrieval Conference TREC 2005, Dec. 31, 2005.

Molla et al., "AnswerFinder at TREC 2004", Proceedings of the 13th Text Retrieval Conference TREC 2004, Dec. 31, 2004.

(56) References Cited

OTHER PUBLICATIONS

Wikipedia, Question Answering, Sep. 8, 2011, http://en.wikipedia.org/wiki/Question_answering.
Wikipedia, List of poets, Sep. 19, 2011, http://en.wikipedia.org/wiki/List_of_poets.
Delicious, The freshest bookmarks that are flying like hotcakes on Delicious and beyond, Sep. 21, 2011, http://delicious.com/.
Wikipedia, List of poets from the United States, Sep. 19, 2011, http://en.wikipedia.org/wiki/list_of_poets_from_the_United_States.
General Architecture for Text Engineering, The GATE User Guide, Mar. 2001, http://gate.ac.uk/releases/gate-2.0alpha2-build484/doc/userguide.html.

* cited by examiner

PROVIDING QUESTION AND ANSWERS WITH DEFERRED TYPE EVALUATION USING TEXT WITH LIMITED STRUCTURE

CROSS-REFERENCE TO RELATED APPLICATIONS

The present invention relates to and claims the benefit of the filing date of commonly-owned, U.S. Provisional Patent Application No. 61/386,017, filed Sep. 24, 2010, the entire contents and disclosure of which is incorporated by reference as if fully set forth herein.

BACKGROUND

Field of the Invention

The invention relates generally to information retrieval systems, and more particularly, the invention relates to a novel query/answer system and method for open domains implementing a deferred type evaluation of candidate answers using text with limited structure.

Description of the Related Art

An introduction to the current issues and approaches of question answering (QA) can be found in the web-based reference http://en.wikipedia.org/wiki/Question_answering. Generally, QA is a type of information retrieval. Given a collection of documents (such as the World Wide Web or a local collection) the system should be able to retrieve answers to questions posed in natural language. QA is regarded as requiring more complex natural language processing (NLP) techniques than other types of information retrieval such as document retrieval, and it is sometimes regarded as the next step beyond search engines.

QA research attempts to deal with a wide range of question types including: fact, list, definition, How, Why, hypothetical, semantically-constrained, and cross-lingual questions. Search collections vary from small local document collections, to internal organization documents, to compiled newswire reports, to the World Wide Web.

Closed-domain QA deals with questions under a specific domain, for example medicine or automotive maintenance, and can be seen as an easier task because NLP systems can exploit domain-specific knowledge frequently formalized in ontologies. Open-domain QA deals with questions about nearly everything, and can only rely on general ontologies and world knowledge. On the other hand, these systems usually have much more data available from which to extract the answer.

Alternatively, closed-domain QA might refer to a situation where only a limited type of questions are accepted, such as questions asking for descriptive rather than procedural information.

Access to information is currently dominated by two paradigms. First, a database query that answers questions about what is in a collection of structured records. Second, a search that delivers a collection of document links in response to a query against a collection of unstructured data, for example, text or html.

A major unsolved problem in such information query paradigms is the lack of a computer program capable of accurately answering factual questions based on information included in a collection of documents that can be either structured, unstructured, or both. Such factual questions can be either broad, such as "what are the risks of vitamin K deficiency?", or narrow, such as "when and where was Hillary Clinton's father born?"

It is a challenge to understand the query, to find appropriate documents that might contain the answer, and to extract the correct answer to be delivered to the user. There is a need to further advance the methodologies for answering open-domain questions.

SUMMARY

The present invention addresses the need described above by providing a dynamic infrastructure and methodology for conducting question answering with deferred type evaluation using text with limited structure.

An aspect of the invention provides a system implementing machine processing for answering questions employing a processing step in which semi-structured information, for example information with limited structure, is extracted from the knowledge and database sources and re-represented in a form suitable for machine processing.

Particularly, a system and method is provided for extracting answer-typing information from sources with limited structure and using that extracted type information for scoring candidate answers.

Thus, in one aspect, there is provided a system and method for providing content to a database used by an automatic QA system. The method includes automatically identifying semi-structured text data from a data source; automatically identifying one or more entity-type relations from said semi-structured text data, said entity-type relation including one or more entities associated with a type; automatically extracting said identified entity-type relations; and, storing said extracted entity-type relations as entity-type data structures in said database, wherein a processing device is configured to perform said automatic identifying of semi-structured text and entity-type relations, said extracting and said storing.

Further to this aspect, the semi-structured text comprises item-delimited markup, said automatically identifying of semi-structured text data comprising parsing content of said data source to identify said item-delimiting markup, said item delimited mark-up specifying said type information and entities forming an entity-type data structure.

Further, the item-delimiting markup includes a title, a header, a recitation of the word "list" of entities of a specified type, bullet markers, parentheses, a hypertext link, a Uniform Resource Locator, or a table in said data source.

In a further aspect, there is provided computer-implemented system and method for automatically generating answers to questions comprising the steps of: determining a lexical answer type (LAT) associated with an input query; obtaining one or more candidate answers to the input query using a data source having semi-structured content; determining a lexical type (LT) for each the one or more obtained candidate answer from the semi-structured content; comparing the query LAT with the candidate answer LT; and generating a score representing a degree of match between the compared query LAT with the candidate answer LT, the score indicative of a quality of the obtained candidate answer, wherein a processing device automatically performs one or more of the determining a query LAT, computing candidate answers, determining a LT, comparing and generating.

In this further aspect, the computer-implemented method further comprises: identifying, in the semi-structured content, one or more entities and associated lexical type information; and, storing, in a data storage device in communication with a QA system, entity-type structures, each entity-type structure representing the one or more entities and associated lexical type information, wherein said determining a lexical type includes accessing said stored entity-type structures to identify a lexical type (LT) from a type associated with said one or more entities stored in said entity-type data structures.

In this further aspect, the comparing comprises parsing each respective the query LAT and the candidate answer LT to obtain respective terms or phrases for each; the comparing further comprising one or more of: matching individual terms of respective query LAT and candidate answer LT, or matching entire phrases of each respective query LAT and candidate answer LT.

A computer program product is provided for performing operations. The computer program product includes a storage medium readable by a processing circuit and storing instructions run by the processing circuit for running a method(s). The method(s) are the same as listed above.

BRIEF DESCRIPTION OF THE DRAWINGS

The objects, features and advantages of the invention are understood within the context of the Detailed Description, as set forth below. The Detailed Description is understood within the context of the accompanying drawings, which form a material part of this disclosure, wherein.

DETAILED DESCRIPTION

Figure 1:
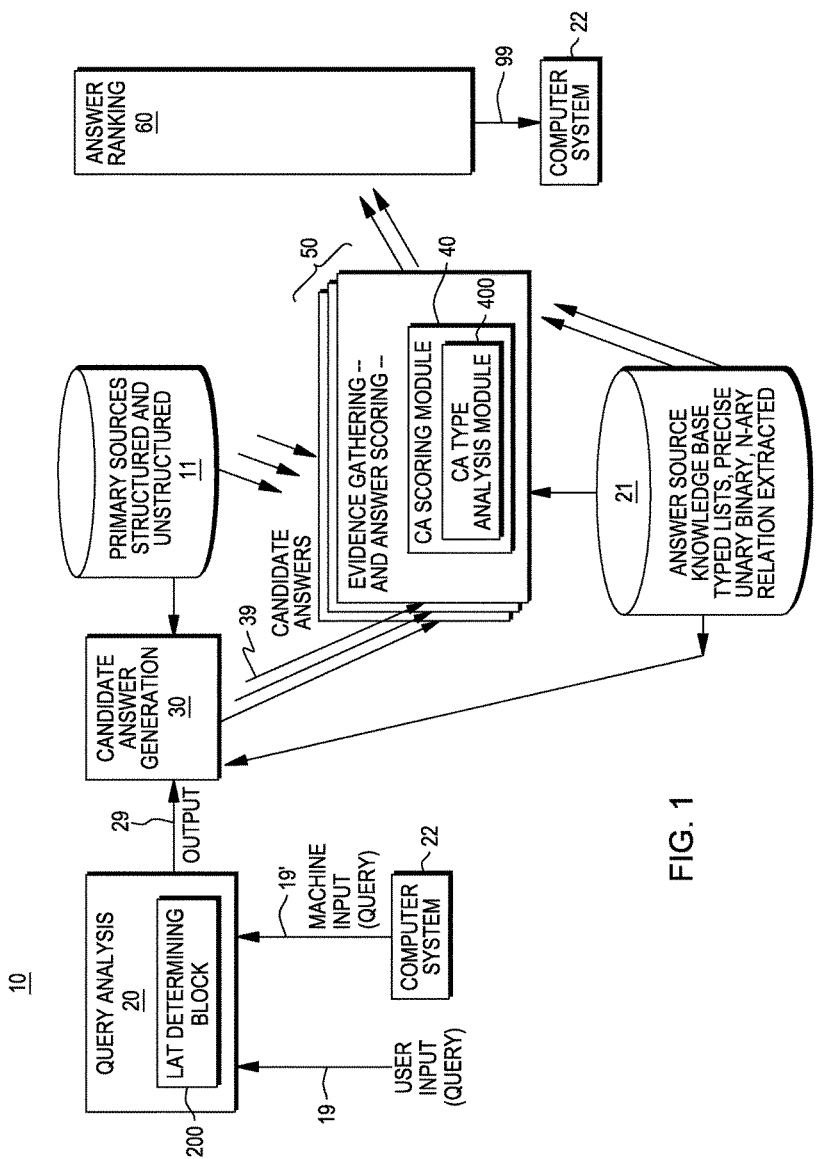
FIG. 1 shows a high level logical architecture 10 of a question/answering method in which the present invention may be employed.

Commonly-owned, co-pending U.S. patent application Ser. No. 12/126,642, titled "SYSTEM AND METHOD FOR PROVIDING QUESTION AND ANSWERS WITH DEFERRED TYPE EVALUATION", incorporated by reference herein, describes a QA system and method in which answers are automatically generated for questions. More particularly, it involves comparing the lexical types determined from the question to the lexical types associated with each candidate answer that is derived from a search. The lexical answer type requested by the question is referred to herein as a "lexical answer type" or "LAT." The lexical types that are associated with each candidate answer is referred to herein as a lexical type or "LT".

The QA system utilizes the system and methodology described below with respect to FIG. 1. Evidence gathering and answer scoring functions 50 are programmed processing components that receive (1) a "lexical answer type" (LAT), e.g., a text string describing some concept and (2) "candidate answer" input(s), e.g., a text string describing some entity. The programmed processing components generate an output including a judgment (e.g., a score) representing to what degree the entity is an instance of the concept. As described in FIGS. 2 and 3 below, this is used as part of answer scoring functions, for example, based on computed candidate answer lexical types (LTs).

As described below with respect to FIG. 3, after processing an input query to determine a LAT and searching and obtaining one or more candidate answers, there is performed for each candidate answer received the steps of matching the candidate against instances in a database which results in generating an output data structure, including the matched instances 132a; looking (searching) for evidence that the candidate answer has the required LAT and retrieving LT(s) associated with those instances in the knowledge base (KB) 132b; and attempting to match LAT(s) with LT(s) (e.g., as determined by a matching function that using a parser, a semantic interpreter and/or a simple pattern matcher) and producing a score representing the degree of match 132c. More particularly, the candidate answer LT and query LAT (s) are represented as lexical strings. Production of the score, referred to as a "TyCor" (Type Coercion) score, is comprised of the three steps: (1) candidate answer to instance matching, (2) instance to type association extraction, and (3) LAT to type matching. The score reflects the degree to which the candidate may be "coerced" to the LAT, where higher scores indicate a better coercion.

In one embodiment, as will be described herein with respect to FIG. 4, the present disclosure extends and complements the effectiveness of the system and method described in co-pending U.S. patent application Ser. No. 12/126,642 by automatically providing a source of information that associates "entities", e.g., candidate answers for questions, to lexical types. Programmed components build or populate a repository of information, e.g., a database or knowledge base (KB) that can be used to accomplish the task of computing one or more lexical types (LT) for each candidate answer by facilitating automatic retrieval of "types" associated with answer instances (answer-typing) in a KB as described with respect to step 132b in FIG. 3. That is, given an instance (e.g., a word such as a noun) the method automatically evaluates the LT specified where the answer-typing data exists in a form that has a limited amount of explicit structure, i.e. semi-structured. In one aspect, the system and method produces a knowledge base of instances and types used in matching.

Furthermore, as will be described herein with respect to FIGS. 5-7, a system and method is provided that can be used to automatically perform the task of "matching" query LATs to candidate answer LTs such as when performing an answer scoring function in the QA system of FIG. 1 that can be implemented at step 132c in FIG. 3. For candidate answer to instance matching, the candidate answer is matched against an instance or instances within the knowledge resource (e.g., a database or KB, or web page), where the form the instance takes depends on the knowledge resource, and lexical types (LT) associated with those instances are retrieved from the knowledge base (KB).

The system and method for extracting and using typing information from sources with limited structure and using that extracted type information for answering questions is now described. In practice, the method is generally performed during the build of the KB, typically as off-line processes; however, can be performed during real-time running of QA invocations, such as described in U.S. patent application Ser. No. 12/126,642.

The system and method utilizes machine processing for answering questions that employs special processing steps in which information with limited structure is automatically extracted from the various data sources and databases and re-represented in a form suitable for machine (automated) processing. The results may then be used in question answering as specified in commonly-owned, co-pending U.S. patent application Ser. No. 12/126,642, whereby given an input query LAT, an output is a judgment whether an entity is an instance of a concept, e.g., by evaluating whether a thing, e.g., noun, or a word, or entity, is of or has the Lexical Answer Type specified.

An embodiment of the process for extracting collections of entity-type pairs from semi-structured text is now described with reference to FIG. 4. As shown in FIG. 4, the computer-implemented method at 202 includes automatically identifying pages (e.g., documents, lists, and other data content) having limited structure (i.e., "semi-structured") that can be stored, accessed or obtained from a data source or database, etc. The data sources may include, but are not limited to, e.g., public or private databases or knowledge bases, Intranets, the Internet, web-pages, which can be searched and/or crawled for content, e.g., using a search engine, Web-based crawler, or other search tools. Further sources can include a memory storage device such as a hard disk drive including content such as, for example, a knowledge base, which can be searched and iterated through to identify stored semi-structured content to be processed.

The process for extracting collections of entity-type pairs from semi-structured text may be done either as a pre-processing step, or on-demand at the time that the question is received as input to the system.

One kind of limited structure the computer-implemented method identifies is pages or documents that are explicitly labeled as having a list (i.e., a labeled list of elements). For example, Wikipedia® (a registered service mark of Wikimedia Foundation, Inc.) pages that are titled "List of" followed by a noun phrase). Lists refer to lists of instances of a specified "type". For example, http://en.wikipedia.org/wiki/List_of_poets presents a list of poets; there is an entry in this list for Robert Frost, which implies that Robert Frost is a poet.

Another type of limited structure is a tag, such as a category in Wikipedia® or a Uniform Resource locator (URL) such as a social bookmark (e.g., from http://delicious.com/). For example, the Wikipedia page for Robert Frost has an explicit Wikipedia category of "English-language poets" which is a subcategory of "Poets by language" which is a subcategory of "Poets." Thus one might conclude that Robert Frost is a poet. Documents of this sort are typically designed to facilitate comprehension by a human reader, unlike fully structured text sources which are designed for machine processing.

Figure 4:
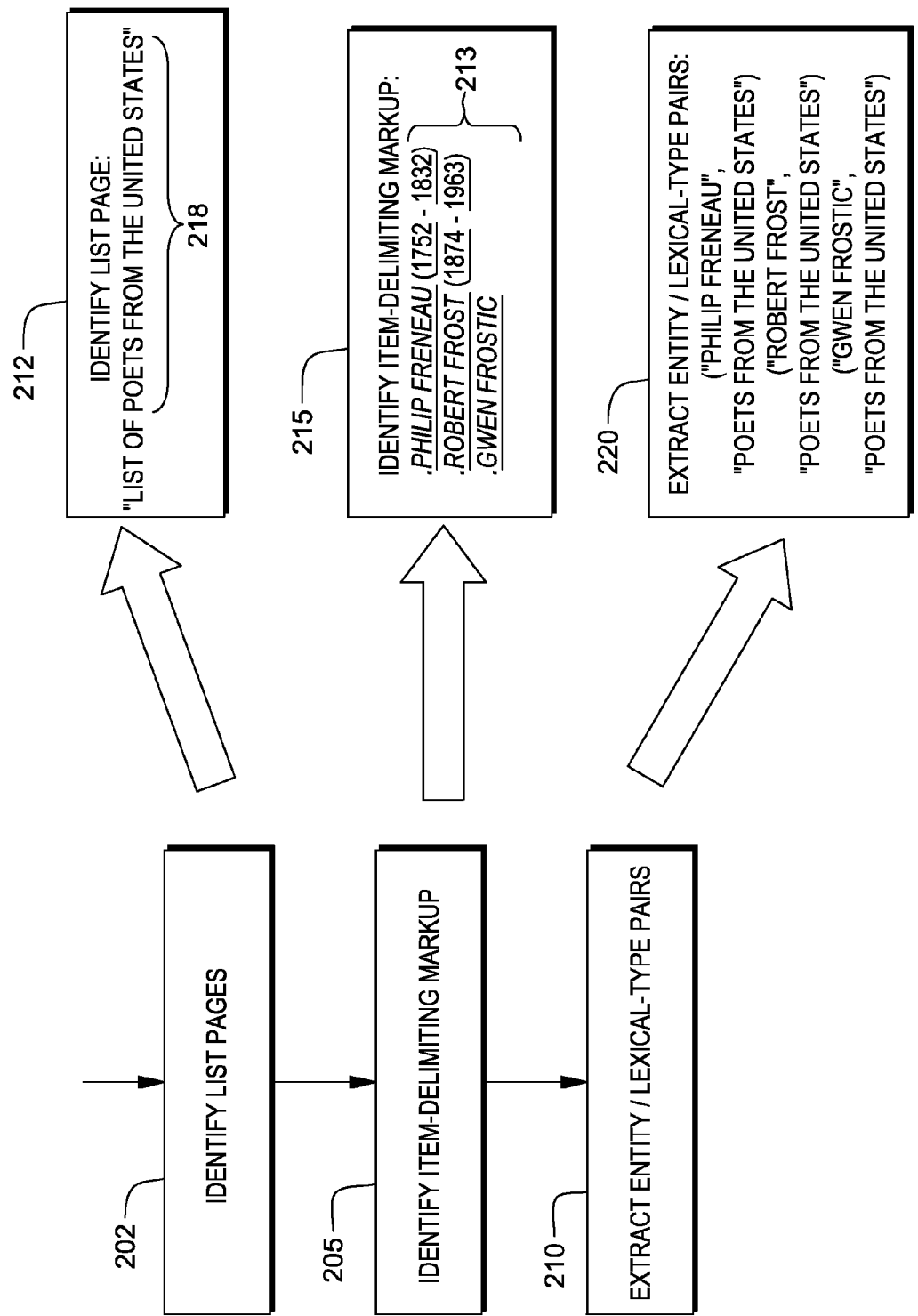
FIG. 4 depicts the method for automatically identifying pages, documents and other content including text of limited structure ("semi-structured") that can be implemented at step 132b of FIG. 3.

Next, as shown in FIG. 4, the computer-implemented method at 205 includes automatically identifying item-delimiting markup. That is, the lists (input) have a markup, e.g., that my be found using a parsing function, for example, including, but not limited to, a title, header or recitation of the word "list", bullet markers, parentheses, a hypertext link which may be an indicator of a list, at table column/row, or any marker which can be identified.

The identified list elements (content) may be tagged, flagged or otherwise identified in the knowledge base or memory e.g., in the disk, volatile or non-volatile memory storage, for subsequent access of the identified contents, e.g., during QA processing in one embodiment or prior to QA processing as a preprocessing step in another embodiment. This includes discerning what might not be desired list content, i.e. not part of list entry. For example, in the list of US Poets, the content that would include the year (e.g., 1852) would not be relevant if the list is of poets, and thus may not be output or flagged.

The next automated step 210 shown in FIG. 4 includes extracting Entity Lexical-type Pairs. That is, besides identifying pages or documents having delimited items (e.g., a bulleted list of contents) the identifying step further includes identifying the lexical type of the delimited items that may be obtained from the content, e.g., a title or header, in front of the list items. In one embodiment, each lexical type and corresponding identified item(s) are then paired and the pair is stored in the knowledge-base using its internal mechanism for storing pairs, e.g., in a relational data-base management system or a more specialized combination of arrays and/or linked list structures. The output of the processing of FIG. 4 is stored in the KB 21 of FIG. 1.

One publicly-available example of such a list page that is identified in step 202, 212 is http://en.wikipedia.org/wiki/List_of_poets_from_the_United_States. That page (as of July, 2010) includes on it a bulleted list 213 with poet names and some years in which they lived in parentheses. This list page may be identified by a search engine or crawler, via a web or Internet-search, or a search at a local networked or attached hard disk drive providing an information base having documents with semi-structured text.

Thus, in the example, as shown in FIG. 4 at 212, a page may be identified as having content such as a title "List of Poets from the United States" 218. Further, the identified list page may include delimited mark-up 215 which may be searched and identified, for example, bullets, as shown in front of each of the items (entities) in the list 213. In the example, as shown in FIG. 4, at 215, those entities that can be recognized as items of the list 213 are marked in italicized text. In this example, a candidate answer LT is assigned "poets from the United States", for example, from the "list of" title 218.

At 220 in FIG. 4, implemented functions perform identifying and extracting of pairs of the entities and their lexical types, inferred from the fact that instances in the list are instances of the lexically expressed "type" derived from the title of the list. In this case, the instances include "Robert Frost" and others, and the lexically expressed type is "poets from the United States." In one embodiment, the LT may be stored in or flagged in a "Type" field with the identified and extracted candidate answer instances (entities or items) relating to the type or contents are stored as linked structures in an "Entity" field. These fields are encoded in a knowledge-base, which may be implemented using a relational database management system or a more specialized combination of arrays and/or linked list structures. The knowledge base thus stores the identified, extracted entity-type relations including a lexical type associated with one or more candidate answer entities as a searchable content structure 220.

In some cases, precise extraction of the lexical type requires distinguishing between the lexical type from the organizational information. For example, "List of novels by point of view" provides elements with lexical type "novel"

and organizes those elements by point of view. In contrast, a "List of novels by Henry James" would provide elements with lexical type "novel by Henry James" and does not give any information about the organization of the list. On the other hand, it may not be necessary to make such precise judgments, depending on the specific LAT to Type Matching (LATTE) configuration used; for example the "headword" passage matcher (see below), that will recognize "novel" as the headword in either case.

Thus, example processing elements implemented by programmed methods stored in a non-transitory storage medium, e.g., a memory storage device, for handling "list of" pages include functionality for: 1. Identifying the "type" that the list is enumerating; 2. Identifying the elements (entities) of the list (using the text of the list elements, hyperlinks on the elements, titles of the documents that those hyperlinks point to, etc.); and, 3. Inferring that each element (identified in #2) is of the type (identified in #1).

In FIG. 4, the first step in the automatic extraction of entity/lexical-type pairs method, in one embodiment, implements a search tool to simply select all of the text following "List of . . . " documents, e.g., from an encyclopedic database source. That is, step 202 above is the identification of list bearing pages within the resource which process can include filtering pages whose title starts with "List of" or, can involve an automatic classifier. In one embodiment, the classifier is trained using statistical machine learning: the learning process is given a set of examples of list bearing pages and examples of non-list bearing pages and one or more algorithms that generate features and the classifier identifies some combination of those features that suggest that a page is or is not list bearing. Features that are useful for this purpose include structural elements (e.g., tables or bulleted lists) and lexical elements (e.g., the presence of the word "list" on the page).

In one embodiment, higher precision extraction requires additional logic. For example, many list names provide additional information about the organization of the list.

In one embodiment, step 205 in FIG. 4, is the abstraction of the mark-up contained in the original pages into two elements related to the extraction task: headers and bullets. Headers refer to section markers, while "bullets", for example, designate a set of mark-up elements that are used within the page to delimit list elements. Other delimiters include but are not limited to: bullets, table rows, etc.

The second step further addresses many different ways that list membership can be indicated in semi-structured text (lists, tables, etc.). For example, many lists include not only the elements but also context and commentary regarding the elements along with functionality implemented for separating the elements from the other text. Furthermore, associating the extracted elements with instances in a fixed knowledge-base may be non-trivial. In some cases, the semi-structured content explicitly provides that information (e.g., the entries in Wikipedia® "List of" pages are usually hyperlinks, and the URLs that they link do can be interpreted as unique identifiers for knowledge-base instances). In other cases, an explicit instance lookup step may be required, using the same mechanism that implements step 132a in FIG. 3. That step is applied to candidate answers, and it is also applied to extracted elements from a list.

In a further embodiment, explicit lookup may not be needed, as the system may map names of instances to lexical types. The process further addresses cases in which the list name includes a conjunction. For example, any element of a "List of cities and towns along the Ohio River" is a city or a town that is near the Ohio River. In one embodiment, a list title in which the lexical type is conjoined is split into two distinct lexical types and a distinct entry in the knowledge-base is added for each. In another embodiment, the entire lexical type including the conjunction may be included in the knowledge-base and special logic for handing the conjunction would be employed at phrase matching time (as described herein below with respect to FIG. 8 processing at 350).

In FIG. 4, step 210 is the extraction of the actual entity/lexical-type pairs. The lexical type is extracted from the title of the page (e.g., by dropping the "List of" at the beginning of the title, if any). Each entity is extracted with the aid of the abstract bullet mark-up added in the prior step. For each bullet, instances of a hyperlink closer to the bullet are searched for and, if there are no hyperlinks between the bullet and the next one, no entity is extracted for that bullet. The target for that hyperlink will be the entity of the extracted entity/lexical-type pair. In the event of missing hyperlinks, the technique is expanded to extract entities as the most salient phrase (usually the subject) in the bullet text, as determined by an automatic salience annotator.

The three-step process shown in FIG. 4 for handling "list of" pages is a specialization of a more general process for extracting entity-type pairs from sources with limited structure:

A more general formalism applies to sources that may not include "list of" pages. The process steps employed in such cases would include: 1. Identifying text that the limited structure implies is a type; 2. Identifying text that the limited structure implies is an entity; 3. Inferring that entities (identified in #2) are instances of types (identified in #1). For example, one could identify a category in a Wikipedia document from the existence of the string "[[Category:" before the text and the string "]]" after the text; the category may be a useful lexical type or it may require normalization or inference to produce a lexical type. For Wikipedia® categories, the entity that has the type is the one that the page is about; its name is the title of the page. Thus one extracts the title from the page in step #2 and associates it with the type in step #3 by adding the title and the extracted lexical type into a knowledge base. For example, the Wikipedia® page with title "Robert Frost" has the following text in its source: "[[Category:Sonneteers]]". In step #1, the word "Sonneteers" is extracted as a lexical type using the pattern described above. In step #2, the string "Robert Frost" is extracted from the document title. In step #3, the pair ("Sonneteers", "Robert Frost") is added to the knowledge base.

The results of the extraction process may further comprise pairs of strings corresponding to entities and types. Pairs of this sort may be used to answer questions using deferred type evaluation. One step in deferred type evaluation is matching the lexical answer type (LAT) to the known types of some candidate answer. That step then becomes relatively easy if the candidate answer is an entry in a fully-structured knowledge-base, because knowledge-base entries (by definition) have formal, unambiguous types whose relationships are known.

In one embodiment, matching the LAT to the type of some candidate answer accounts for cases where the entities and types were taken directly from text. For example, given a question asking for a person, and a candidate answer that appears on a list of poets, one can only conclude that the candidate has a valid type if one can determine that all poets are people. This may be possible using some dictionary or thesaurus resource, which is more reliable if the LAT and the known types are disambiguated to specific word senses.

Logic for using resources such as dictionaries or thesauri to determine whether terms like person and poet are consistent with each other is encoded in Primitive Term Matchers, described below.

Figure 3:
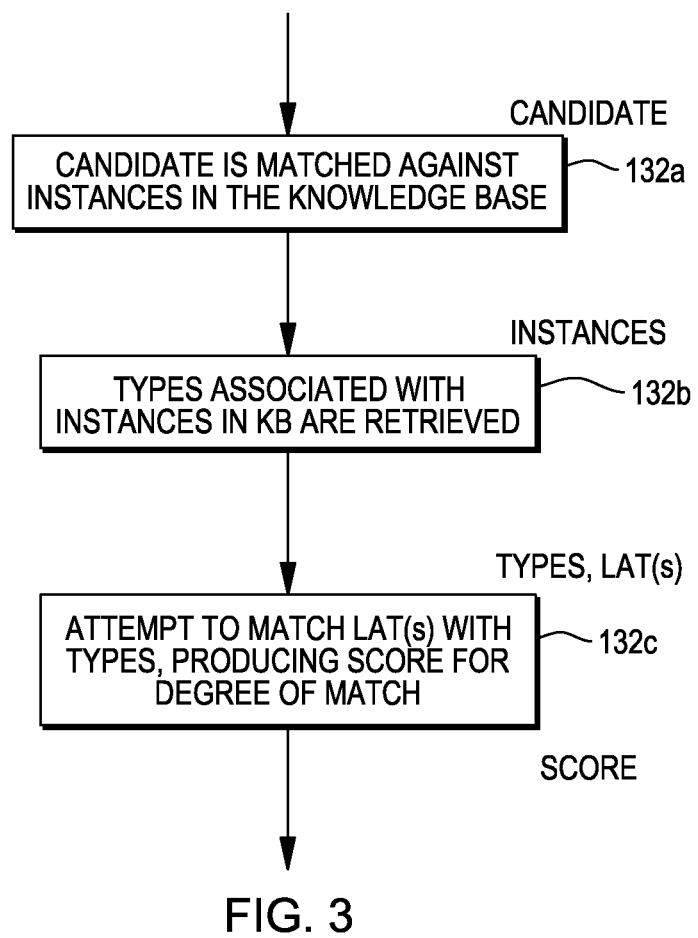
FIG. 3 is a flow diagram illustrating score production performed at step 132 of the flow diagram of FIG. 2.

In a further aspect, the function or process for matching that can be implemented at 132c in FIG. 3, is now described in connection with the process 300 described in connection with FIG. 5.

In one aspect, the evidence gathering and answer scoring module 50 of QA system 10 is programmed to receive inputs including a question LAT 302, obtained from processing of the query, and an input including the candidate answer lexical type 312 obtained, for example, from the KB. As shown in FIG. 5, in one embodiment, a text processing function 325 is invoked, and, in one embodiment, one or more computer-implemented processes for "LAT to Type Matching" (LATTE) may be performed including: 1. Matching individual terms (e.g., matching "country" to "nation"); and 2. Matching entire phrases (e.g., matching "country with a national currency" to "nation with its own currency"). The latter (phrase matchers) are composed of the former (term matchers) plus control logic implemented to determine which terms to try to match and how to combine the scores of the term matches into a score for the phrase match.

Figure 5:
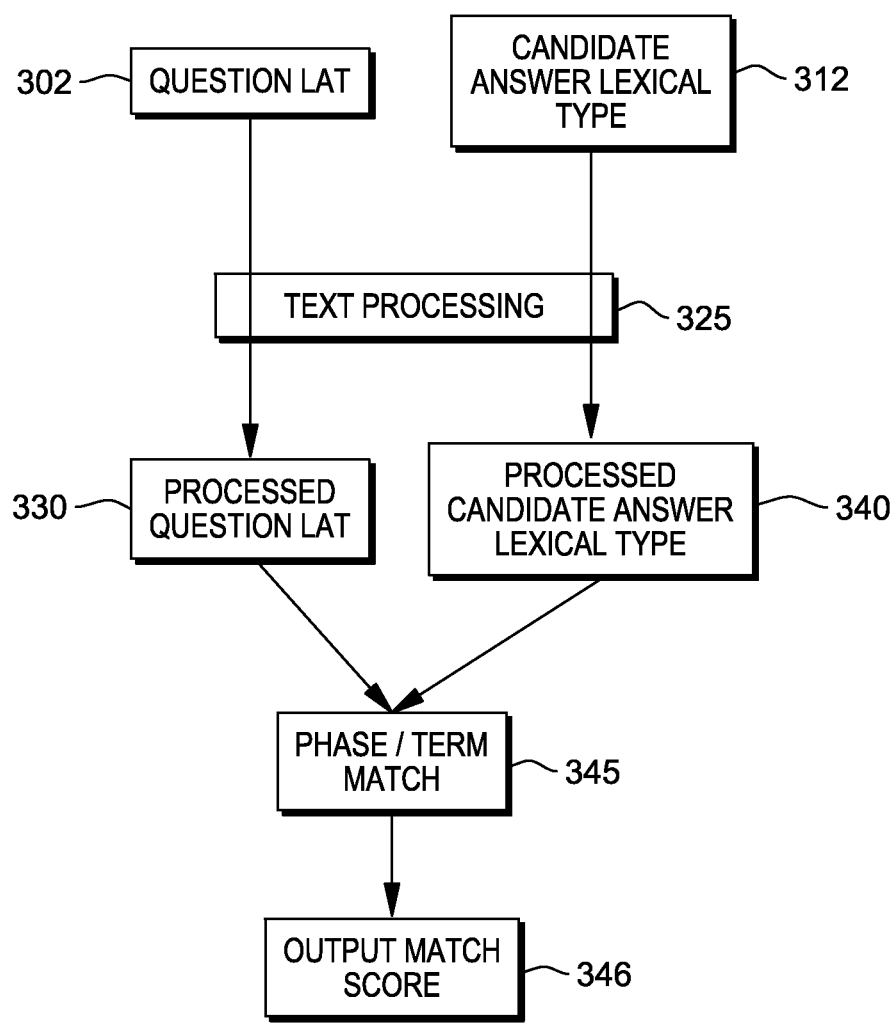
FIG. 5 illustrates a LATTE process 300 applying phase and term matching functions that can be implemented at step 132c of FIG. 3.

As shown in FIG. 5, in one embodiment, this text processing 325 may be implemented by an off the shelf text processor including functionality for breaking the received question LAT 302 and candidate lexical type 312 phrases into tokens, and determining the grammatical relationships amongst the tokenized words or phrases, or grammatical roles therebetween.

More particularly, the text processing component 325 divides each of the inputs into distinct terms (e.g., via a tokenization process). In one embodiment, the component further applies syntactic and/or semantic analysis as required by the phrase matcher or term matchers using established state-of-the-art natural-language processing technologies; for example, it may use a parser to identify the head word of its input, for use by the head-word passage matcher. For example, breaking down a phrase grammatically leaves a root word and word(s) that modify or relate to the word (modifier (e.g., adjective) of a noun phrase including a head-word (the noun)).

In one aspect, as referred to herein and shown in FIG. 5, this text processing applied to produce both question LAT results 330 and the processed candidate answer lexical type (LT) results 340. These results 330, 340 may be organized as linked nodes in a database which may be then subject to one or more matching components embodied as programmed phrase and term matcher components 345 in FIG. 5. These components generate a matching score 346 indicating a degree of match.

Figure 6:
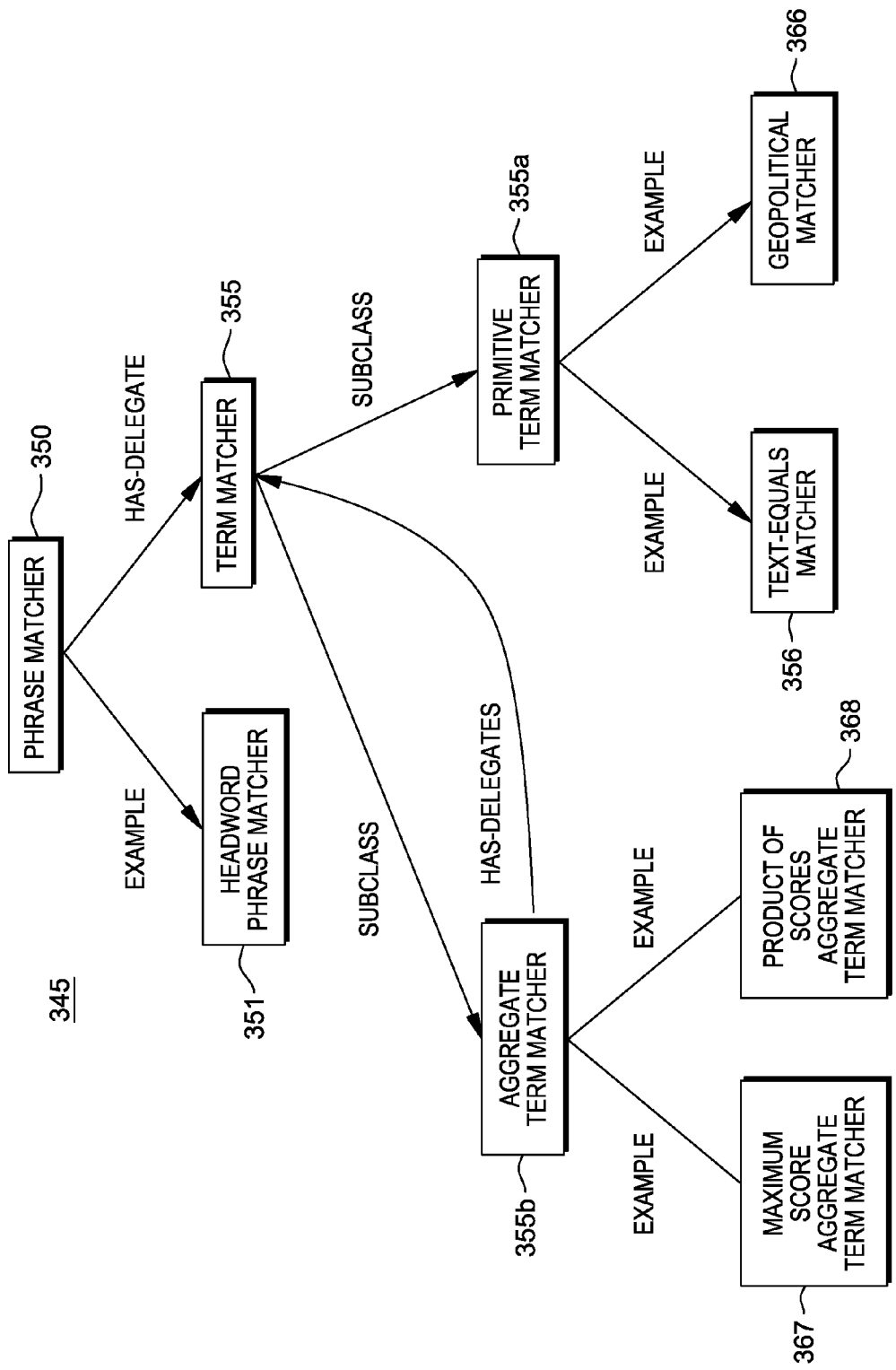
FIG. 6 depicts a block diagram of the phrase and term processing functions 345 of FIG. 5

FIG. 6 depicts a block diagram of an example phrase and term matching methodology 345. These functions are embodied as (1) a phrase match and (2) a term matcher. A computer-programmed phrase matcher component 350 implements processing to receive an input pair of phrases (each of which consists of one or more terms) and produce as output a judgment regarding the degree of match between the two phrases. A term matcher 355 takes as input of pair of terms and produces as output a judgment regarding the degree of match between the two terms.

In one aspect, the phrase matching component 350 provides functionality to decide which pairs of terms to compare using the term matcher 355 and how to combine the conclusions of the term matcher into a conclusion regarding the degree of match of the phrases. The term matcher is a "delegate" of the phrase matcher. The term "delegate" refers to a relationship among two functional units in which one of the units invokes the other to provide an implementation of some of its functionality.

In view of FIG. 6, one example of a phrase matcher 350 is a headword phrase matcher 351, which treats each phrase as a headword plus a collection of modifiers and attempts to match headwords to headwords and modifiers to modifiers. That is, a headword phrase matcher 351 component applies its specified term matcher to the grammatical head-word of the LAT and the grammatical head-word of the candidate answer lexical type. For example, such a matcher configured with a "string-equals" term matcher would give a high match score to "European nation" and "nation on Earth" because both phrases have the head-word "nation."

In one embodiment, shown in FIG. 6, there are two broad sub-classes of term-matching components implemented: 1. Primitive term matchers 355a employ a single, specific matching strategy and provide a score based on the degree of match; and, 2. Aggregate term matchers 355b combine multiple matchers (which may be primitive or aggregate).

A Primitive term matcher 355a employs a strategy to determine the extent to which the input pair(s) of terms match each other. A simple example of a primitive term matcher is a "text-equals" primitive term matcher 356 which considers a pair of terms with identical text to match and any other pair of terms to not match. For example, text-equals primitive term matcher 356 provides a score of 1.0 to strings that are identical and 0.0 to strings that are not identical. A more complex example of a primitive term matcher is the "geopolitical" term matcher 366, which applies only to pairs of terms that are both geopolitical entities and gives high scores when the terms are equivalent (e.g., "U.S." and "America") and/or closely related (e.g., "U.S." and "Texas"). A more complex example of a primitive term matcher 355a is a "thesaurus synonym" term matcher (not shown), which provides a high score to terms that are synonyms in a known thesaurus; such a matcher may be more precise if it uses the surrounding context to disambiguate the terms. Another example of a primitive term matcher 355a is a "string-edit-distance" term matcher (not shown), which gives a high score to terms that have approximately the same letters (e.g., elephant~=elephand), which can be very useful in contexts where minor spelling errors are common.

In FIG. 6, an aggregate term matcher 355b employs one or more "delegate" term matchers each of which may be primitive 355a or aggregate 355b. If a delegate term matcher is an aggregate, it will also have delegates, which will also be primitive or aggregate. Each aggregate term matcher invokes one or more of its delegates according to its control logic. The aggregate term matcher implements functionality for combining the score of those delegates according to its combination logic. Each primitive term matcher employs internal logic for computing a score and returning the score.

In one embodiment, the matchers that are combined together by a single aggregate term matcher 355b are delegates of that matcher. Each aggregate term matcher implements a control flow as described in FIG. 7 among its delegates and some strategy for combining the results of the delegates into a single score.

Aggregate term matcher combining functionality includes flow control among its delegates and implements strategy for combining the results of applying the delegate term matchers into a final conclusion regarding the degree of match between the pair of terms. In one embodiment, the combined results of the delegates generate a single score.

For example, an aggregate term matcher 355b runs all of its delegates and then returns the sum of all of the scores of all the delegates. An example of an aggregate term matcher 355b is a maximum score aggregate term matcher 367, which takes an input pair of terms, applies each of its delegates to that pair of terms, and returns the maximum score across all of the delegates. In another embodiment, an aggregate term matcher 355b includes a product of scores aggregate term matcher 368 which takes an input pair of terms, applies each of its delegates to that pair of terms, and multiplies together all of the scores of all of the delegates. In one embodiment, an aggregate term matchers may use a statistical model derived from machine learning to combine the scores of the delegates into a score for the aggregate. In one embodiment, logistic regression is the machine learning method that takes labeled training instances with numerical features and produces a statistical model that can be used to classify instances with numerical features; it does so by assigning a numerical weight to each feature, and then computing a score by multiplying the numerical feature scores by the weights.

Figure 7:
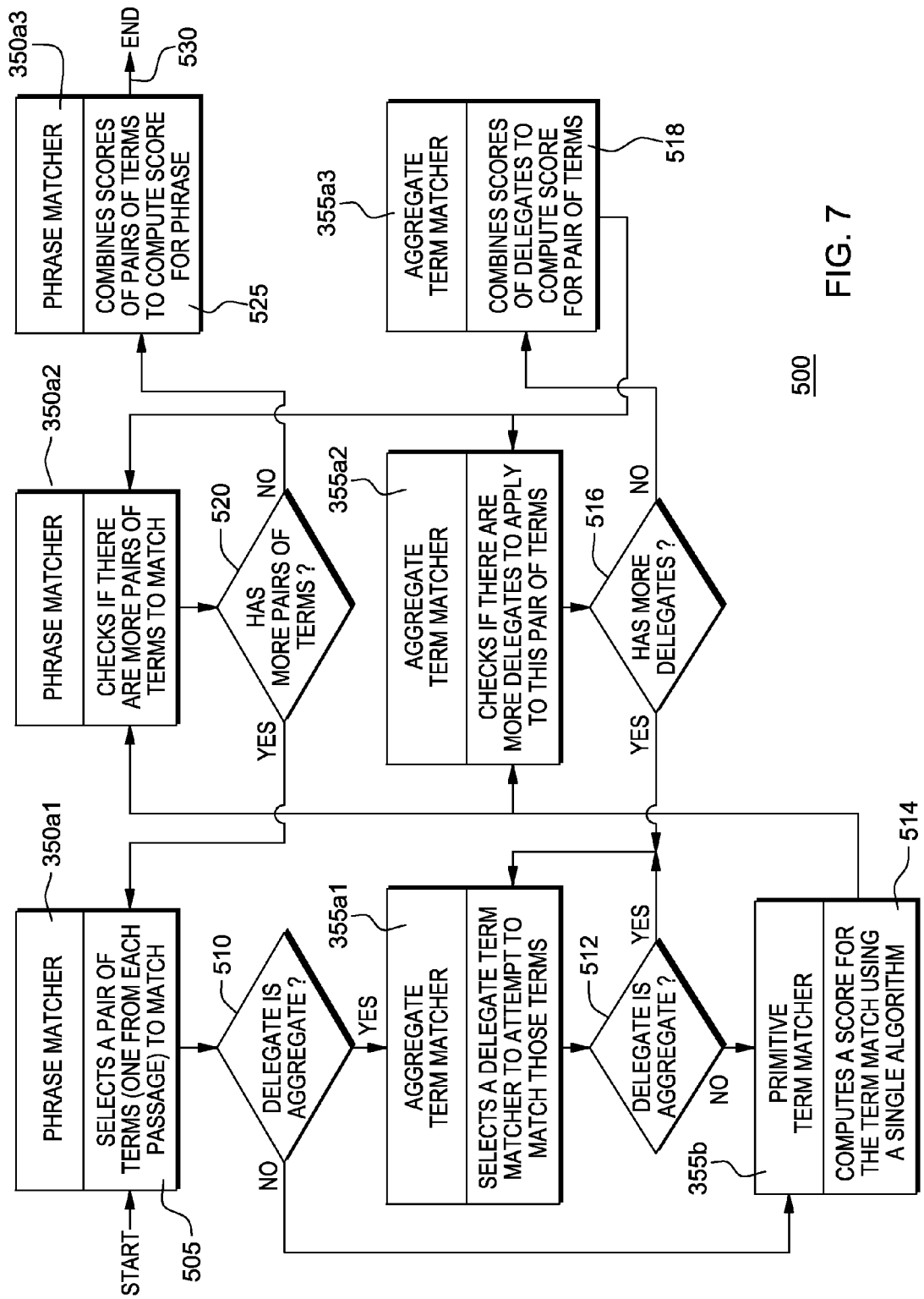
FIG. 7 illustrates an example flow of control 500 for the LATTE process and score production among the components depicted in FIG. 6.

FIG. 7 illustrates an example flow of control 500 for the LATTE process and score production among the components depicted in FIG. 6. At 505, after receiving as input text strings representing the phrases to be matched, the Phrase matcher 350a1 at 510 implements logic to choose pairs of terms, one from each of the two input phrases—the phrases comprising: question terms and passage terms to match. At 510, after the phrase matcher 350a1 determines which terms to invoke, and if any terms are delegate terms, will determine whether a delegate term is aggregated (i.e., includes multiple terms). At 510, if a delegate term is aggregated, the phrase matcher invokes its delegate term aggregate matcher implementing functions 355a1; otherwise, will invoke a primitive term matcher 355b. At 512, aggregate term matcher functions 355a1 selects one of its delegates to match that pair of terms; that delegate is either a primitive 355b or the lower-level aggregate matcher implementing functionality 355a1.

At 514, primitive term matcher 355b uses its single, atomic term matching logic to compute a score indicating how well the pair of terms match. In one embodiment, atomic algorithms may determine whether a pair of terms mean the same thing (e.g., using a dictionary with synonyms). The result is returned to whichever component invoked it; that component including a higher level aggregate matcher functionality 355a2, or the phrase matcher functionality 350a2.

At 516, the aggregate term matcher functions 355a2 checks to see if it has any additional delegate term matchers to try to apply to the given pair of terms in which case it returns to either the lower level aggregate matcher functions 355a1 or a higher level aggregate matcher functionality 355a3.

At 518, with no more delegate term matchers to apply, the aggregate term matcher functions 355a3 computes a final match score for the pair of terms by combining results from all of its delegates. That result is returned to whatever component invoked the aggregate term matcher, either the higher-level aggregate functionality 355a2 or the phrase matcher functions 350a2.

At 520, the phrase matcher functions 350a2 checks to see if there are any other pairs of terms that it needs to match in order to determine how well the phrase matches. Thus the phrase matcher 350a2 invokes phrase matcher functions 350a1; otherwise, will invoke further phrase matcher functionality 350a3. That is, at 525, with no more pairs of terms to match, the phrase matcher functions 350a3 computes a final score for the two input phrases by combining results from each call to its delegate term matcher. That result is returned as the final output of the phrase matching process which ends at 530.

Figure 8:
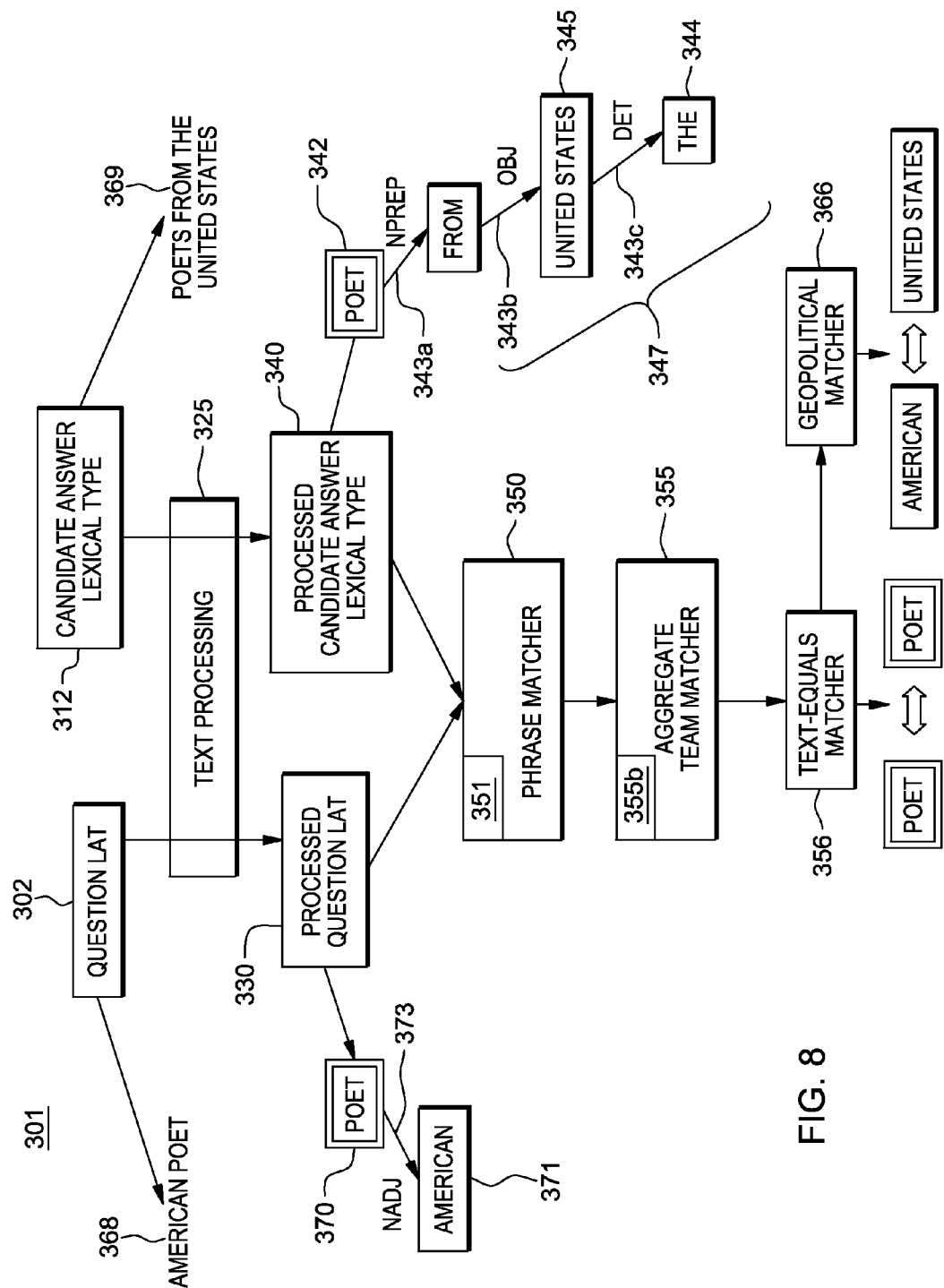
FIG. 8 illustrates an example flow control for the LATTE process of FIGS. 5-6
Figure 9:
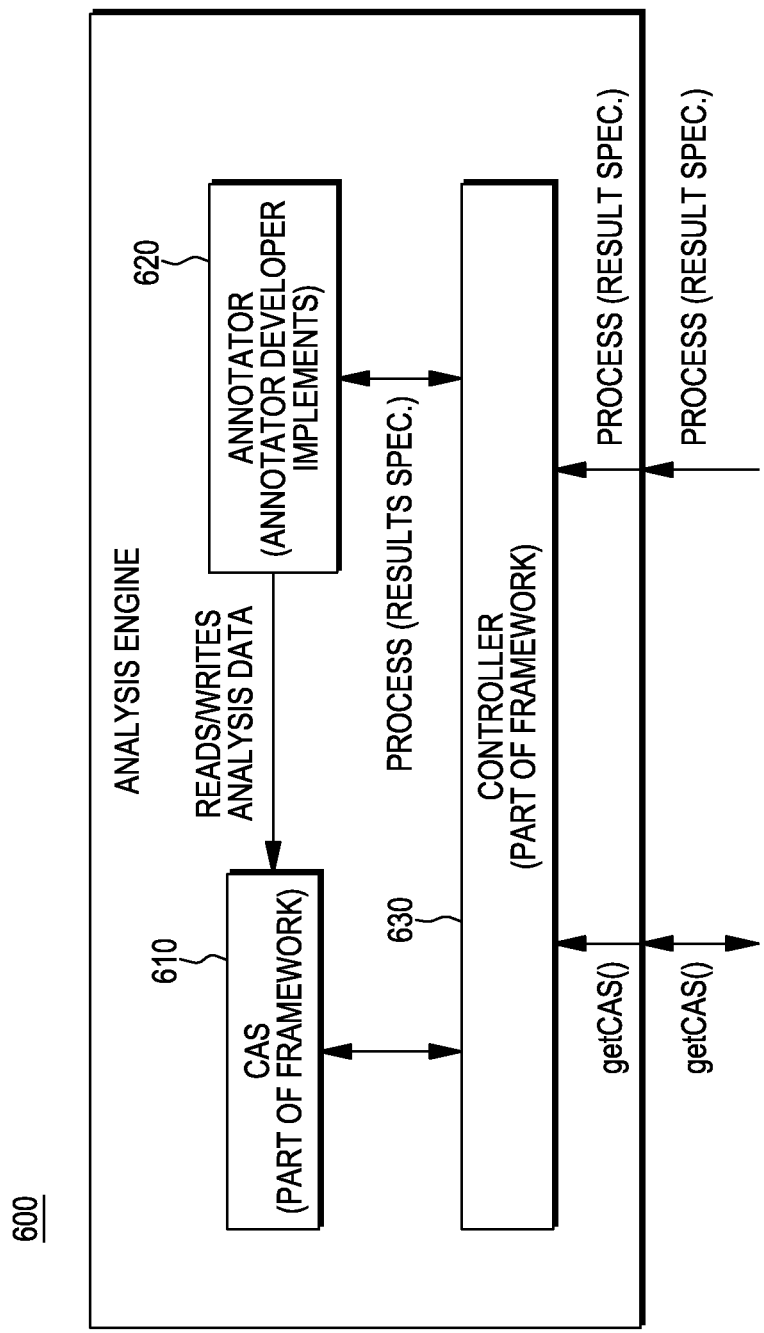
FIG. 9 depicts an aspect of a UIMA framework implementation for providing one type of analysis engine for processing CAS data structures.

Utilizing matching process as described in FIG. 7, FIG. 8 illustrates an example flow control for the LATTE process of FIGS. 5-6 applied for a non-limiting example of an initial query or question "What American poet published his first book in 1913 while living in England?" A question analysis component identifies "American poet" as a LAT in this question according to common QA system processing such as described in U.S. patent application Ser. No. 12/126,642. A candidate answer generation component of the question answering system identifies, for the example, a search candidate answer: e.g., Robert Frost. In one embodiment, the method determines whether this candidate answer is an instance of the LAT (i.e., is "Robert Frost" an "American poet") using semi-structured resources such as obtained in the real-time or off-line manner described above with respect to FIG. 4.

In the flow control for the example matching process of FIG. 7 applied for the non-limiting example, when the LATTE process (LAT to lexical type matching process) is automatically run as part of the QA system process, a specific question LAT 302 and a specific candidate answer lexical type 312 is available. In the example, the question LAT that was extracted is "American poet" 368. The example candidate answer is "Robert Frost." The pairs extracted in FIG. 4 include a pair relating "Robert Frost" to the lexical type "poets from the United States," which is a candidate-answer lexical type 369. In the example embodiment described with respect to processing of FIG. 6, the question LAT 302 "American poet" 368 and the candidate answer lexical type 312 "poets from the United States" 369 are received as inputs to text processing component 325.

In FIG. 8, text processing 325 by a text processor provides outputs (e.g., splitting into tokens, labeling with grammatical roles) including versions of the received question LAT 330 and the candidate answer lexical type 340. The phrase matcher 350 will then receive these inputs and compare them against each other. It does so by applying its specified term matcher to the terms it selects from its inputs. The algorithm for selecting terms is specific to any specific instantiation of a phrase matcher; for example, the head-word phrase matcher selects the head-word of each phrase to match and also attempts to match each modifier of the head-word in the first input phrase to each modifier of the second phrase.

In this non-limiting example, the text processing 325 includes performing an analysis to identify head-word and provides lemma forms for terms and grammatical relationships among those terms; a natural-language parser, provides all of that information. For the example processing of FIG. 6, the results 330 of processing the example question LAT include, for example, the identified head-word for the example question LAT—a root or lemmatized head-word "Poet" 370 (e.g., "poets" is lemmatized to head-word "poet"), and further detecting that "American" 371 is acting as noun-modifying adjective as indicated by connector 373 labeled "nadj" indicating a grammatical relations amongst the terms, e.g. an adjective modifying the noun "poet"). Likewise, text processing results 340 of the candidate answer lexical type 312 includes: the lemmatized result head-word "Poet" 342 (e.g., "poets" is lemmatized to head-word "poet"). The processing further includes automatically detecting the prepositional phrase "from the United States"

347 where it is determined the preposition "from", object of preposition "United States", and determiner "the" for the processed candidate answer lexical type 312 (typically this information would be provided by a natural-language parser). The root or head-word and all grammatical relationships may be represented in software program as nodes interconnected by labeled connectors, e.g., connector 343*a* labeled "prep" pointing head-word 342 to the preposition "from"; the connector 343*b* labeled "obj" pointing the preposition "from" to the object "United States"; and, the connector 343*c* labeled "det" pointing the object "United States" to the determiner "the" indicating a grammatical relations amongst the phrase terms, including determiner "the" 344.

The phrase matcher 350 then automatically applies a specified term matcher to compare processed results (terms) 330 in the question's lexical answer type 302 to results (terms) 340 in a lexical type of the candidate answer 312.

First, the phrase matcher 350 determines which terms in the question's lexical answer type to attempt to match to terms in the candidate answer's lexical type. For example, the phrase matcher determines that the head-word (i.e., the root node for each graph, in both cases, labeled "poet") is in the same logical position; this graph is derived from the output of the natural-language parser. The phrase matcher 350 also determines that the noun-adjective modifier 371 (e.g., "American") fills a comparable role to the object of the preposition 345 in the processed candidate answer lexical type 345 (e.g., "United States"). The aggregate term matcher 355 is then responsible for determining if those terms do actually match. In this example, two delegate primitive term matchers 355 are used: a "text-equals" term matcher 356 that receives the inputs and implements functions to determine and conclude that "poet" 370 from the question LAT and "poet" 342 from the candidate answer lexical type are exactly equal and a specialized geopolitical matcher 366 that determines from the input that "American" 371 and "United States" 345 are consistent with each other.

More particularly, a programmed processing system is configured with a headword phrase matcher 351 that is configured with a term matcher, e.g., the maximum score aggregate term matcher 355*a*. The maximum score aggregate term matcher 355*a* is configured with two delegate term matchers: the text-equals primitive matcher 356 and the geopolitical term matcher 366. This phrase matcher 351 receives as input two phrases: "American poet" 368 and "poet from the United States" 369. Prior to executing the phrase matcher, text analysis has been run that has identified "poet" as the headword 342, 370 of each of these phrases. It also indicates grammatical relationships among the terms, e.g., that "American" modifies poet in the first phrase and that "United States" modifies poet in the second. The phrase matcher takes pairs of terms from each results 330, 340 and uses the results of text analysis to decide to compare "poet" in the first phrase to "poet" in the second phrase (because each is the headword of its phrase). Consequently, it invokes the aggregate term matcher 355*b* on this pair of terms. The aggregate term matcher 355*b* then invokes the text-equals primitive term matcher, which observes that the strings are identical and gives the pair of terms a high score. The aggregate term matcher also invokes the geopolitical primitive term matcher, which does not provide an opinion because it only applies to geopolitical entities. The aggregate term matcher 355*b* then computes the maximum of these results, which is the high score from the text-equals primitive term matcher. Thus it has a high score for the pair ("poet", "poet"). Next, the phrase matcher 351 decides to compare "American" to "United States" because both are modifiers of the headword. It does so by invoking the aggregate term matcher 355*b*. The aggregate term matcher invokes the text-equals primitive term matcher 356, which observes that the strings are not identical and gives the pair of terms a 0 score. The aggregate term matcher also invokes the geopolitical primitive term matcher 366 which uses a knowledge-base of geopolitical entities which asserts that "American" and "United States" refer to the same place; the geopolitical primitive term matcher 366 thus returns a high score for this pair of terms. The aggregate term matcher takes these two results (a 0 score from text-equals and a high score from geopolitical) and takes the maximum among them, which is a high score.

It returns this high score to the phrase matcher, which now has high scores for both the headword ("poet") and the modifier ("American") in the first phrase matching corresponding terms in the second phrase. It combines these and returns a conclusion indicating that the two phrases match very well.

Having found the question LAT and the candidate answer lexical type match, and the system concludes that the candidate answer "Robert Frost," meets the type requirements for this question.

Thus, the two components: the process for extracting collections of entity-type pairs from semi-structured text of FIG. 4; and, the process for matching in FIGS. 5-7 are tightly integrated and complement each other when used in QA system, and further also be used in radically different devices.

FIG. 1 shows a system diagram described in U.S. patent application Ser. No. 12/126,642 depicting a high-level logical architecture 10 and methodology in which the system and method for deferred type evaluation using text with limited structure is employed in one embodiment.

Generally, as shown in FIG. 1, the high level logical architecture 10 includes a Query Analysis module 20 implementing functions for receiving and analyzing a user query or question. The term "user" may refer to a person or persons interacting with the system, or refers to a computer system 22 generating a query by mechanical means, and where the term "user query" refers to such a mechanically generated query and context 19'. A candidate answer generation module 30 is provided to implement a search for candidate answers by traversing structured, semi structured and unstructured sources contained in a Primary Sources module 11 and in an Answer Source Knowledge Base (KB) module 21 containing collections of relations and lists extracted from primary sources. All the sources of information can be locally stored or distributed over a network, including the Internet.

The Candidate Answer generation module 30 of architecture 10 generates a plurality of output data structures containing candidate answers based upon the analysis of retrieved data. In FIG. 1, an Evidence Gathering and answer scoring module 50 interfaces with the primary sources 11 and knowledge base 21 for concurrently analyzing the evidence based on passages having candidate answers, and scores each of candidate answers, in one embodiment, as parallel processing operations. In one embodiment, the architecture may be employed utilizing the Common Analysis System (CAS) candidate answer structures as is described in commonly-owned, issued U.S. Pat. No. 7,139,752, the whole contents and disclosure of which is incorporated by reference as if fully set forth herein.

As depicted in FIG. 1, the Evidence Gathering and Answer Scoring module 50 comprises a Candidate Answer Scoring module 40 for analyzing a retrieved passage and scoring each of candidate answers of a retrieved passage. The Answer Source Knowledge Base (KB) 21 may comprise one or more databases of structured or semi-structured sources (pre-computed or otherwise) comprising collections of relations (e.g., Typed Lists). In an example implementation, the Answer Source knowledge base may comprise a database stored in a memory storage system, e.g., a hard drive.

An Answer Ranking module 60 provides functionality for ranking candidate answers and determining a response 99 returned to a user via a user's computer display interface (not shown) or a computer system 22, where the response may be an answer, or an elaboration of a prior answer or request for clarification in response to a question—when a high quality answer to the question is not found. A machine learning implementation is further provided where the "answer ranking" module 60 includes a trained model component (not shown) produced using a machine learning techniques from prior data.

The processing depicted in FIG. 1, may be local, on a server, or server cluster, within an enterprise, or alternately, may be distributed with or integral with or otherwise operate in conjunction with a public or privately available search engine in order to enhance the question answer functionality in the manner as described. Thus, the method may be provided as a computer program product comprising instructions executable by a processing device, or as a service deploying the computer program product. The architecture employs a search engine (e.g., a document retrieval system) as a part of Candidate Answer Generation module 30 which may be dedicated to searching the Internet, a publicly available database, a web-site (e.g., IMDB.com) or, a privately available database. Databases can be stored in any storage system, non-volatile memory storage systems, e.g., a hard drive or flash memory, and can be distributed over the network or not.

As mentioned, the system and method of FIG. 1 makes use of the Common Analysis System (CAS), a subsystem of the Unstructured Information Management Architecture (UIMA) that handles data exchanges between the various UIMA components, such as analysis engines and unstructured information management applications. CAS supports data modeling via a type system independent of programming language, provides data access through a powerful indexing mechanism, and provides support for creating annotations on text data, such as described in (http://www.research.ibm.com/journal/sj/433/gotz.html) incorporated by reference as if set forth herein. It should be noted that the CAS allows for multiple definitions of the linkage between a document and its annotations, as is useful for the analysis of images, video, or other non-textual modalities (as taught in the herein incorporated reference U.S. Pat. No. 7,139,752).

In one embodiment, the UIMA may be provided as middleware for the effective management and interchange of unstructured information over a wide array of information sources. The architecture generally includes a search engine, data storage, analysis engines containing pipelined document annotators and various adapters. The UIMA system, method and computer program may be used to generate answers to input queries. The method includes inputting a document and operating at least one text analysis engine that comprises a plurality of coupled annotators for tokenizing document data and for identifying and annotating a particular type of semantic content. Thus it can be used to analyze a question and to extract entities as possible answers to a question from a collection of documents.

As further shown in greater detail in the architecture diagram of FIG. 1, the "Query Analysis" module 20 receives an input that comprises the query 19 entered, for example, by a user via their web-based browser device. An input query 19 may comprise a text string. The query analysis block 20 includes additionally a Lexical Answer Type (LAT) block 200 that implements functions and programming interfaces to provide additional constraints on the answer type (LAT). The computation in the block 20 comprises but is not limited to the Lexical Answer Type. The LAT block 200 includes certain functions/sub-functions (not shown) to determine the LAT.

As mentioned above, a LAT of the question/query is the type (i.e. the descriptor) of the referent of the entity that is a valid answer to the question. In practice, LAT is the descriptor of the answer detected by a natural language understanding module comprising a collection of patterns and/or a parser with a semantic interpreter. With reference to the Lexical Answer Type (LAT) block 200, in the query analysis module 20 of FIG. 1, the LAT represents the question terms that identify the semantic type of the correct answer. In one embodiment, as known, a LAT may be detected in a question through pattern LAT detection rules. These rules are implemented and can be encoded manually or learned by machine automatically through association rule learning. In this case, the natural language understanding model can be limited to implementation the rules.

Figure 2:
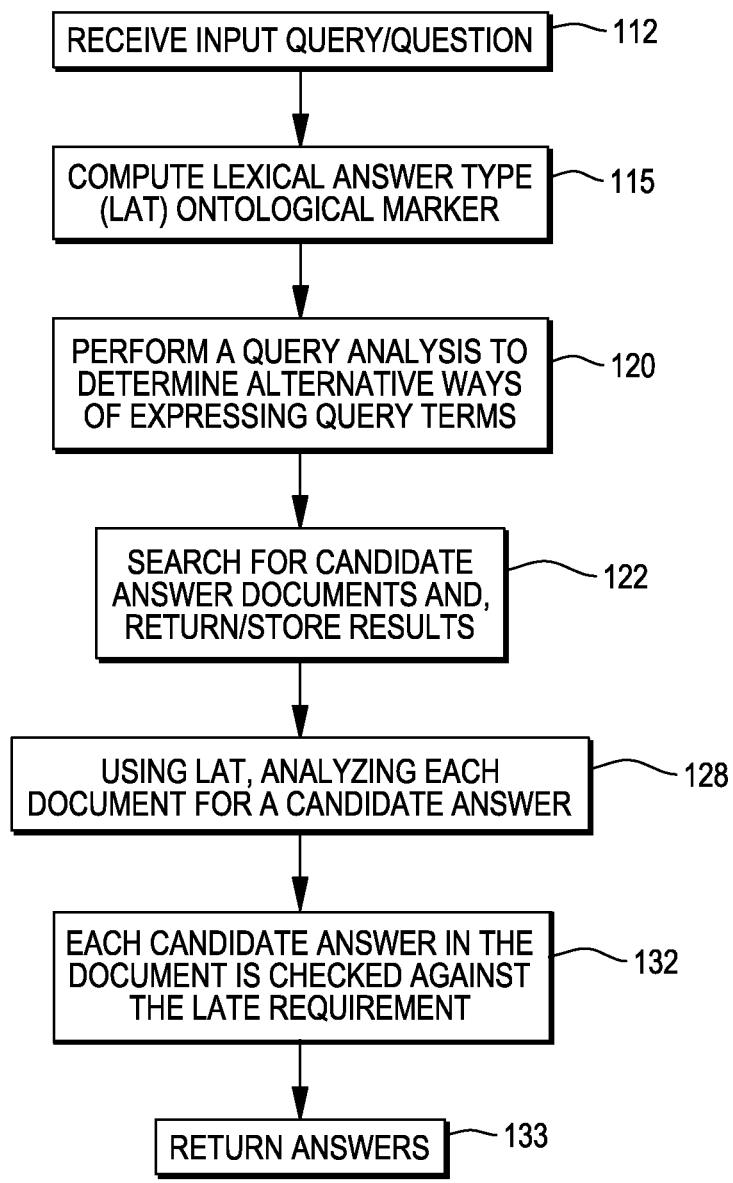
FIG. 2 is a flow diagram of a method for conducting questions and answers with deferred type evaluation in a QA system.

FIG. 2 is a flow diagram of a computer programmed method for conducting questions and answers with deferred type evaluation in one embodiment as described in Ser. No. 12/126,642. Generally, in the method of "deferred type evaluation" depicted in FIG. 2, a first processing step 112 represents the step of receiving, at a processing device, an input query, and generating a data structure, e.g., a CAS structure, including a question string and context for input to a Lexical Answer Type (LAT) processing unit block 200 (FIG. 1) where, as indicated at step 115, the Query is analyzed and lexical answer type (LAT) is computed. As a result of processing in the LAT processing component, as run at step 115, there is generated an output data structure, e.g., a CAS structure, including the computed LAT and possibly additional terms from the original question.

As result of processing in the LAT block 200 then, as typified at step 120, there is generated an output data structure, e.g., a CAS structure, including the computed original query (terms, weights) (as described in co-pending U.S. patent application Ser. No. 12/152,441 the whole contents and disclosure of which is incorporated by reference as if fully set forth herein.

Returning to FIG. 2, at processing step 122, there is performed the step of searching for candidate answer documents, and returning the results.

As a result of processing in a candidate answer generation module, as typified at step 122, there is generated an output data structure, e.g., a CAS structure, including all of the documents found from the data corpus (e.g., primary sources and knowledge base).

In FIG. 2, step 128, there is depicted the step of analyzing each document for a candidate answer to produce a set of candidate answers which may be output as a CAS structure using LAT (the lexical answer type).

For the example questions discussed herein, as a result of processing in the candidate answer generation module 30, as typified at step 132, FIG. 2, those candidate answers that are found in the document is checked against the query LAT requirement and will be returned as answer(s) at step 133 (based on their scores).

FIG. 3 described herein above, is a flow diagram illustrating score production performed at step 132 of the flow diagram of FIG. 2.

In particular, as shown in FIG. 3, step 132 implements the following steps: for each candidate answer received, there is performed matching the candidate against instances in the database (step 132*a*) which results in generating an output data structure, e.g., a CAS structure, including the matched instances; retrieving lexical types (LT) associated with those instances in the knowledge base (KB) (step 132*b*); and, at step 132*c* attempting to match LAT(s) with lexical types (LT), producing a score representing the degree of match.

More particularly, the candidate answer LT and query LAT(s) are represented as lexical strings. Production of the score, referred to herein as the "TyCor" (Type Coercion) score, is comprised of three steps: candidate to instance matching, instance to type association extraction, and LAT to type matching. The score reflects the degree to which the candidate may be "coerced" to the LAT, where higher scores indicate a better coercion.

In candidate to instance matching, the candidate is matched against an instance or instances within the knowledge resource, where the form the instance takes depends on the knowledge resource. With a structured knowledge base, instances may be entities, with an encyclopedic source such as Wikipedia instances may be entries in the encyclopedia, with lexical resources such as the WordNet® lexical database (A trademark of the Trustees of Princeton University) instances may be synset entries (sets of synonyms), and with unstructured document (or webpage) collections, instances may be any terms or phrases occurring within the text. If multiple instances are found, a rollup using an aggregation function is employed to combine the scores from all candidates. If no suitable instance is found, a score of 0 is returned.

Next, instance association information is extracted from the resource. This information associates each instance with a type or set of types. Depending on the resource, this may take different forms; in a knowledge base, this corresponds to particular relations of interest that relate instances to types, with an encyclopedic source, this could be lexical category information which assigns a lexical type to an entity, with lexical resources such as WordNet®, this is a set of lexical relations, such as hyponymy, over synsets (e.g. "artist" is a "person"), and with unstructured document collections this could be co-occurrence or proximity to other terms and phrases representing type.

Then, each LAT is then attempted to match against each type. A lexical manifestation of the type is used. For example, with encyclopedias, this could be the string representing the category, with a lexical resource such as WordNet®, this could be the set of strings contained within the synset. The matching is performed by using string matching or additional lexical resources such as Wordnet® to check for synonymy or hyponymy between the LAT and type. Special logic may be implemented for types of interest; for example person matcher logic may be activated which requires not a strict match, synonym, or hyponym relation, but rather that both LAT and type are hyponyms of the term "person". In this way, "he" and "painter", for example, would be given a positive score even though they are not strictly synonyms or hyponyms. Finally, the set of pairs of scores scoring the degree of match may be resolved to a single final score via an aggregation function.

Thus, in an implementation set forth in steps 132*a*-132*c* of FIG. 3, for the example question described herein, each candidate answer type (LT) in the document is automatically checked against the LAT requirement. This may be performed by the Candidate Answer Scoring block 40, shown in FIG. 1, as part of the evidence gathering and answer scoring module 50, and particularly, a Candidate Answer Type Analysis module 400 that produces a probability measure that Candidate Answer is of the correct type based, e.g., on a grammatical and semantic analysis of the document with which the Candidate Answer appears. In one embodiment, this processing entails using an automated scoring function that compares candidate answer lexical types (LTs) to the query LAT and producing a score for each candidate answer. The a scoring function can be expressed as a weighted combination of different typing scores, and, in one embodiment it may be expressed as $$TyCorScore=0.2*TyCorWordNet+0.5*TyCorKB+0.4*TyCorDoc$$

This expresses the preferences for more organized sources such as knowledge bases (KB), followed by type matching in a retrieved document, and synonyms being least preferred way of matching types.

Other combinations of scores are possible, and the optimal scoring function can be learned as described in the co-pending U.S. patent application Ser. No. 12/152,411 entitled SYSTEM AND METHOD FOR PROVIDING ANSWERS TO QUESTIONS, filed May 14, 2008, the content and disclosure of which is incorporated by reference as if fully set forth herein.

The scoring function itself is a mathematical expression, that—in one embodiment—could be based on the logistic regression function (a composition of linear expressions with the exponential function), and may be applied to a much larger number of typing scores.

The output of the "Candidate Answer Scoring" module 40 is a CAS structure having a list of answers with their scores given by the processing modules in the answer scoring modules included in the Candidate Answer Scoring block 40 of the evidence gathering and answer scoring module 50. In one embodiment, these candidate answers are provided with TyCor matching score as described herein above.

Finally, returning to FIG. 2, at step 133, the top candidate answers (based on their TyCor scores) are returned.

In one embodiment, the above-described modules of FIGS. 1, 4, 5-7 can be represented as functional components in UIMA is preferably embodied as a combination of hardware and software for developing applications that integrate search and analytics over a combination of structured and unstructured information. The software program that employs UIMA components to implement end-user capability is generally referred to as the application, the application program, or the software application.

The UIMA high-level architecture, one embodiment of which is illustrated in FIG. 1, defines the roles, interfaces and communications of large-grained components that cooperate to implement UIM applications. These include components capable of analyzing unstructured source artifacts, such as documents containing textual data and/or image data, integrating and accessing structured sources and storing, indexing and searching for artifacts based on discovered semantic content.

Although not shown, a non-limiting embodiment of the UIMA high-level architecture includes a Semantic Search Engine, a Document Store, at least one Text Analysis Engine (TAE), at least one Structured Knowledge Source Adapter, a Collection Processing Manager, at least one Collection Analysis Engine, all interfacing with Application logic. In one example embodiment, the UIMA operates to access both structured information and unstructured information to generate candidate answers and an answer in the manner as discussed herein. The unstructured information may be considered to be a collection of documents, and can be in the form of text, graphics, static and dynamic images, audio and various combinations thereof.

Aspects of the UIMA are further shown in FIG. 7, where there is illustrated a Analysis Engine (AE) 600 that can be a component part of the Text Analysis Engine (TAE). Included in the AE 600 is a Common Analysis System (CAS) 610, an annotator 620 and a controller 630. A second embodiment of a TAE (not shown) includes an aggregate Analysis Engine composed of two or more component analysis engines as well as the CAS, and implements the same external interface as the AE 600.

Common Analysis System 610

The Common Analysis System (CAS) 610 is provided as the common facility that all Annotators 620 use for accessing and modifying analysis structures. Thus, the CAS 610 enables coordination between annotators 620 and facilitates annotator 620 reuse within different applications and different types of architectures (e.g. loosely vs. tightly coupled). The CAS 610 can be considered to constrain operation of the various annotators.

The CAS 610 principally provides for data modeling, data creation and data retrieval functions. Data modeling preferably defines a tree hierarchy of (data) types, as shown in the example Table 1 provided below. The types have attributes or properties referred to as features. In preferred embodiments, there are a small number of built-in (predefined) types, such as integer (int), floating point (float) and string; UIMA also includes the predefined data type "Annotation". The data model is defined in the annotator descriptor, and shared with other annotators. In the Table 1, some "Types" that are considered extended from prior art unstructured information management applications to accommodate question answering in the preferred embodiment of the invention include:

TABLE 1

| TYPE (or feature) | TYPE's PARENT (or feature type) |
|---|---|
| Query Record | Top |
| Query | Query Record |
| Query Context | Query Record |
| Candidate Answer Record | Annotation |
| Candidate Answer | Candidate Answer Record |
| Feature: Candidate AnswerScore | Float |
| QueryLexical Answer Type | Annotation |
| CandidateAnswer LT | Annotation |
| Feature: TyCorScore | Float |

In Table 1, for example, all of the question answering types (list in the left column) are new types and extend either another new type or an existing type (shown in the right column). For example, both Query and Query Context are kinds of Query Record, a new type; while Candidate Answer Record extends the UIMA type Annotation, but adds a new feature CandidateAnswerScore which is a Float. In addition, Table 1 describes the query LAT as having a UIMA Annotation type; CandidateAnswerLT is also an Annotation, but with an additional feature TyCorScore of type Float.

CAS 610 data structures may be referred to as "feature structures." To create a feature structure, the type must be specified (see TABLE 1). Annotations (and—feature structures) are stored in indexes.

The CAS 610 may be considered to be a collection of methods (implemented as a class, for example, in Java or C++) that implements an expressive object-based data structure as an abstract data type. Preferably, the CAS 610 design is largely based on a TAE Feature-Property Structure, that provides user-defined objects, properties and values for flexibility, a static type hierarchy for efficiency, and methods to access the stored data through the use of one or more iterators.

The abstract data model implemented through the CAS 610 provides the UIMA 100 with, among other features: platform independence (i.e., the type system is defined declaratively, independently of a programming language); performance advantages (e.g., when coupling annotators 610 written in different programming languages through a common data model); flow composition by input/output specifications for annotators 610 (that includes declarative specifications that allow type checking and error detection, as well as support for annotators (TAE) as services models); and support for third generation searching procedures through semantic indexing, search and retrieval (i.e. semantic types are declarative, not key-word based).

The CAS 610 provides the annotator 620 with a facility for efficiently building and searching an analysis structure. The analysis structure is a data structure that is mainly composed of meta-data descriptive of sub-sequences of the text of the original document. An exemplary type of meta-data in an analysis structure is the annotation. An annotation is an object, with its own properties, that is used to annotate a sequence of text. There are an arbitrary number of types of annotations. For example, annotations may label sequences of text in terms of their role in the document's structure (e.g., word, sentence, paragraph etc), or to describe them in terms of their grammatical role (e.g., noun, noun phrase, verb, adjective etc.). There is essentially no limit on the number of, or application of, annotations. Other examples include annotating segments of text to identify them as proper names, locations, military targets, times, events, equipment, conditions, temporal conditions, relations, biological relations, family relations or other items of significance or interest.

Typically an Annotator's 620 function is to analyze text, as well as an existing analysis structure, to discover new instances of the set of annotations that it is designed to recognize, and then to add these annotations to the analysis structure for input to further processing by other annotators 620.

In addition to the annotations, the CAS 610 of FIG. 7 may store the original document text, as well as related documents that may be produced by the annotators 620 (e.g., translations and/or summaries of the original document). Preferably, the CAS 610 includes extensions that facilitate the export of different aspects of the analysis structure (for example, a set of annotations) in an established format, such as XML.

More particularly, the CAS 610 is that portion of the TAE that defines and stores annotations of text. The CAS API is used both by the application and the annotators 620 to create and access annotations. The CAS API includes, preferably, at least three distinct interfaces. A Type system controls creation of new types and provides information about the relationship between types (inheritance) and types and features. One non-limiting example of type definitions is provided in TABLE 1. A Structure Access Interface handles the creation of new structures and the accessing and setting of values. A Structure Query Interface deals with the retrieval of existing structures.

The Type system provides a classification of entities known to the system, similar to a class hierarchy in object-oriented programming. Types correspond to classes, and features correspond to member variables. Preferably, the Type system interface provides the following functionality: add a new type by providing a name for the new type and specifying the place in the hierarchy where it should be attached; add a new feature by providing a name for the new feature and giving the type that the feature should be attached to, as well as the value type; and query existing types and features, and the relations among them, such as "which type(s) inherit from this type".

Preferably, the Type system provides a small number of built-in types. As was mentioned above, the basic types are int, float and string. In a Java implementation, these correspond to the Java int, float and string types, respectively. Arrays of annotations and basic data types are also supported. The built-in types have special API support in the Structure Access Interface.

The Structure Access Interface permits the creation of new structures, as well as accessing and setting the values of existing structures. Preferably, this provides for creating a new structure of a given type; getting and setting the value of a feature on a given structure; and accessing methods for built-in types. Feature definitions are provided for domains, each feature having a range.

In an alternative environment, modules of FIGS. 1, 2 can be represented as functional components in GATE (General Architecture for Text Engineering) (see: http://gate.ac.uk/releases/gate-2.0alpha2-build484/doc/userguide.html). Gate employs components which are reusable software chunks with well-defined interfaces that are conceptually separate from GATE itself. All component sets are user-extensible and together are called CREOLE—a Collection of REusable Objects for Language Engineering. The GATE framework is a backplane into which plug CREOLE components. The user gives the system a list of URLs to search when it starts up, and components at those locations are loaded by the system. In one embodiment, only their configuration data is loaded to begin with; the actual classes are loaded when the user requests the instantiation of a resource.). GATE components are one of three types of specialized Java Beans: 1) Resource: The top-level interface, which describes all components. What all components share in common is that they can be loaded at runtime, and that the set of components is extendable by clients. They have Features, which are represented externally to the system as "meta-data" in a format such as RDF, plain XML, or Java properties. Resources may all be Java beans in one embodiment. 2) ProcessingResource: Is a resource that is runnable, may be invoked remotely (via RMI), and lives in class files. In order to load a PR (Processing Resource) the system knows where to find the class or jar files (which will also include the metadata); 3) LanguageResource: Is a resource that consists of data, accessed via a Java abstraction layer. They live in relational databases; and, VisualResource: Is a visual Java bean, component of GUIs, including of the main GATE gui. Like PRs these components live in .class or .jar files.

In describing the GATE processing model any resource whose primary characteristics are algorithmic, such as parsers, generators and so on, is modelled as a Processing Resource. A PR is a Resource that implements the Java Runnable interface. The GATE Visualisation Model implements resources whose task is to display and edit other resources are modelled as Visual Resources. The Corpus Model in GATE is a Java Set whose members are documents. Both Corpora and Documents are types of Language Resources (LR) with all LRs having a Feature Map (a Java Map) associated with them that stored attribute/value information about the resource. FeatureMaps are also used to associate arbitrary information with ranges of documents (e.g. pieces of text) via an annotation model. Documents have a DocumentContent which is a text at present (future versions may add support for audiovisual content) and one or more AnnotationSets which are Java Sets.

As UIMA, GATE can be used as a basis for implementing natural language dialog systems and multimodal dialog systems having the disclosed question answering system as one of the main submodules. The references, incorporated herein by reference above (U.S. Pat. Nos. 6,829,603 and 6,983,252, and 7,136,909) enable one skilled in the art to build such an implementation.

Figure 10:
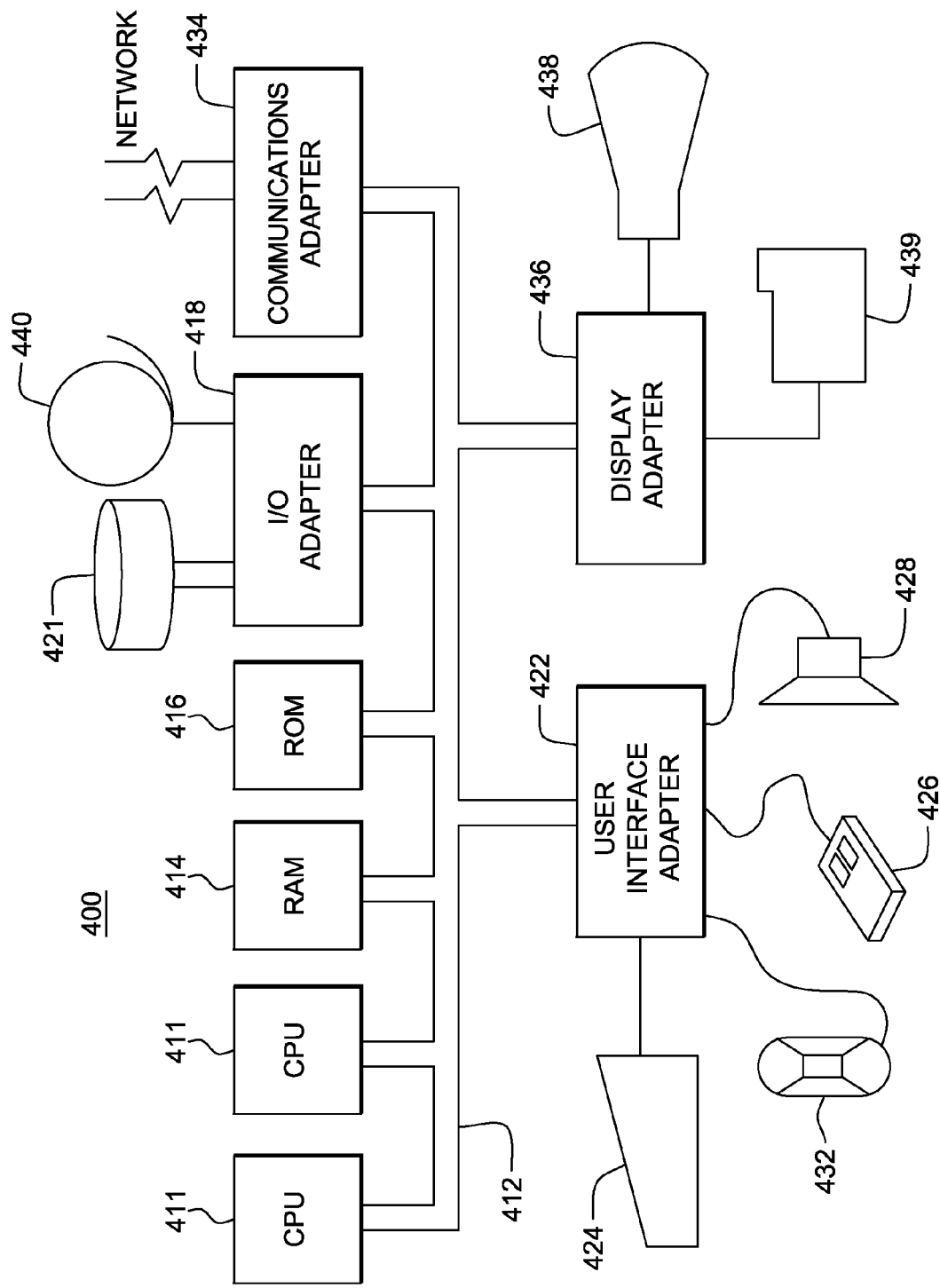
FIG. 10 illustrates an exemplary hardware configuration to run method steps described in FIGS. 2-8 in one embodiment.

FIG. 10 illustrates an exemplary hardware configuration of a computing system 400 in which the present system and method may be employed. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function (s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A computer-implemented method for automatically generating answers to questions comprising the steps of:
    analyzing a corpus of documents to identify a document containing a list, wherein said list contains item-delimiting markup;
    parsing said list to identify type information and entities in said list indicated by said markup, wherein to identify said type information and entities in said list comprises:
    extracting a type from a title indicating said list;
    determining a presence of item-delimeter mark-up associated with said list, each mark-up delimiter including or not including one or more associated hyperlinks, and for each determined item-delimiter mark-up item:
    if a hyperlink is included:
    obtaining an instance of a hyperlink in closest proximity to the mark-up item-delimeter, and extracting an entity from a target of said hyperlink instance; and
    if a hyperlink is not included:
    using an annotator to identify phrases included in text associated with the item-delimeter mark-up, and extracting a most salient phrase as said entity;
    creating entity-type pairs, wherein said entity-type pairs comprise said extracted entities and the identified type from said list;
    receiving a lexical answer type associated with an input query;
    receiving a candidate answer to said query;
    determining whether said candidate answer is associated with an entity in said created entity-type pairs;
    for any associated entity-type pairs, comparing said extracted type in said associated entity-type pair with said lexical answer type;
    generating a type-matching score, wherein said type-matching score is indicative of a quality of said obtained candidate answer based on matching types; and
    using said type-matching score to evaluate said candidate answer as an answer to said query;
    wherein a hardware processor automatically performs one or more of said steps.

2. The computer-implemented method of claim 1, further comprising:

storing, in a further memory storage device, said created entity-type pairs, each entity-pair structure representing said one or more entities and associated type, wherein said determining whether said candidate answer is associated with an entity in said entity-type pairs comprises: accessing said stored entity-type pairs to identify a type from an entity-type pair.

3. The computer-implemented method of claim 2, wherein said corpus analyzing, said list identifying, said list parsing and said creating entity-type pairs are performed off-line as a pre-processing step.

4. The computer-implemented method of claim 2, wherein said corpus analyzing, said list identifying, said list parsing and said creating entity-type pairs are performed on-demand by a Question Answer system at a time of receiving said input query.

5. The computer-implemented method of claim 2, further comprising:

parsing each respective said lexical answer type associated with an input query and said identified type for any associated entity-type pair of a candidate answer, to obtain respective terms or phrases for each.

6. The computer-implemented method of claim 1, wherein said comparing said identified type in said associated entity-type pair with said lexical answer type comprises:

matching individual terms of respective lexical answer type associated with an input query and said identified type for any associated entity-type pair, or matching entire phrases of each respective lexical answer type associated with an input query and said identified type for any associated entity-type pair.

7. The computer-implemented method of claim 5, further comprising:

determining which terms of respective said lexical answer type associated with an input query and said identified type for any associated entity-type pair are to be used for said term matching;

obtaining individual scores based on degree of match between terms of respective said lexical answer type associated with an input query and said identified type for any associated entity-type pair; and combining obtained scores of said matches determined for said phrase matching.

8. The computer-implemented method as claimed in claim 1, wherein said analyzing a corpus of documents to identify a document containing a list comprises:

parsing content of said corpus to identify said item-delimiting markup, said item delimited mark-up specifying an associated type and entities forming an entity-type pair.

9. The computer-implemented method as claimed in claim 1, wherein said item-delimiting markup includes a title, a header, a recitation of the word "list" of entities of a specified type, bullet markers, parentheses, a hypertext link, a Uniform Resource Locator, a table in said data source.

10. The computer-implemented method as claimed in claim 1, wherein said item-delimiting markup includes a tag representing a category or sub-category including entities of a specified type.

11. The computer-implemented method of claim 6, wherein term matching is one of: aggregate term matching or primitive term matching.

12. The computer-implemented method of claim 11, wherein said phrase matching employs a phrase matcher, said method comprising:

receiving, at said phrase matcher, an input pair of phrases, each phrase having one or more terms, and producing, at said phrase matcher, a judgment regarding a degree of match between the two phrases.

13. The computer-implemented method of claim 12, wherein said primitive term matching employs a term matcher, said method comprising:

receiving, at said term matcher, an input pair of terms;

producing, at said term matcher, a judgment regarding the degree of match between the pair of terms.

14. The computer-implemented method of claim 12, wherein a phrase matcher comprises: a headword phrase matcher, wherein each phrase is a headword plus a collection of modifiers, said phrase matching comprising: matching headwords to headwords and modifiers to modifiers.

15. The computer-implemented method of claim 11, wherein said primitive term matcher is a geopolitical term matcher for matching pairs of terms that are both geopolitical entities.

16. The computer-implemented method of claim 11, wherein said primitive term matcher is a thesaurus synonym term matcher for matching pairs of terms that are synonyms in a known thesaurus.

17. The computer-implemented method of claim 11, wherein said primitive term matcher is a string-edit-distance term matcher for matching pairs of terms that have approximately the same letters.

18. The computer-implemented method of claim 12, wherein said phrase matcher comprises an aggregate term matcher for combining multiple term matchers, said aggregate term matcher employing one or more delegate term matchers, a delegate term matcher being one of primitive term matcher or an aggregate term matcher, an aggregate term matcher invoking one or more of its delegates, said aggregate term matcher combining a score of delegate term matchers according to a combination logic.

19. The computer-implemented method of claim 18, further comprising:

receiving, at the phrase matcher, input text strings representing the phrases to be matched;

implementing logic, at said phrase matcher, for choosing pairs of terms, from phrases comprising: question terms and passage terms; and determining if any terms are delegate terms, and if any terms are delegate terms, determining whether a delegate term is aggregated to includes multiple terms; and responsive to determining a delegate term is aggregated, invoking, at the phrase matcher, its delegate term aggregate matcher; otherwise, invoking a primitive term matcher.

20. The computer-implemented method of claim 19, wherein said aggregate term matcher runs all of its delegate matchers; and returns a sum of all of the scores of all the delegates, said aggregate term matcher comprising one of:

a maximum score aggregate term matcher for receiving an input pair of terms, applying each of its delegates to that pair of terms, and returning a maximum score across all of the delegates; or a product of scores aggregate term matcher for receiving an input pair of terms, applying each of its delegates to that pair of terms, and multiplying together all of the scores of all of the delegate.

21. The computer-implemented method of claim 20, wherein said aggregate term matcher uses a statistical model derived from machine learning to combine the scores of the delegates into a score for the aggregate.

* * * * *